(12) United States Patent
Liu et al.

(10) Patent No.: US 10,021,882 B1
(45) Date of Patent: Jul. 17, 2018

(54) VALUE-ADDED PRODUCTS FROM SMALL GRAINS, METHOD OF MAKING AND USES THEREOF

(71) Applicant: The United States of America, as represented by the Secretary of Agriculture, Washington, DC (US)

(72) Inventors: Keshun Liu, Pocatello, ID (US); Frederic T. Barrows, Bozeman, MT (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 461 days.

(21) Appl. No.: 14/327,253

(22) Filed: Jul. 9, 2014

Related U.S. Application Data

(60) Provisional application No. 61/844,278, filed on Jul. 9, 2013.

(51) Int. Cl.
*A21D 2/00* (2006.01)
*A21D 6/00* (2006.01)

(52) U.S. Cl.
CPC ..................................... *A21D 6/00* (2013.01)

(58) Field of Classification Search
None
See application file for complete search history.

(56) References Cited

U.S. PATENT DOCUMENTS

| | | | |
|---|---|---|---|
| 6,045,868 A * | 4/2000 | Rayas | C09D 189/00 427/384 |
| 6,147,206 A * | 11/2000 | Doner | C08B 37/006 424/750 |

OTHER PUBLICATIONS

ZC: Zhang Chunhong; Process for continuously extracting a plurality of products from highland barley: Publication # CN101617787 A; Publication Date: Jan 6, 2010).*

Delcour: Alkaline Hydrogen Peroxide Extraction of Wheat Bran Non-starch Polysaccharides; Journal of Cereal Science 34 (2001) 29-35.*

* cited by examiner

*Primary Examiner* — Patricia A George
(74) *Attorney, Agent, or Firm* — John Fado; G. Byron Stover

(57) ABSTRACT

The present invention relates to methods of producing value added products from small grains, methods of making and uses thereof. In an exemplary embodiment, one value added product is used to prepare an aquaculture feed.

10 Claims, 12 Drawing Sheets

VALUE-ADDED PRODUCTS FROM SMALL GRAINS, METHOD OF MAKING AND USES THEREOF

REFERENCE TO RELATED APPLICATIONS

This application claim priority to U.S. Ser. No. 61/844,278 filed Jul. 9, 2013 which is incorporated herein by reference in its entirety

FIELD OF THE INVENTION

Embodiments of the invention relate to processes for fractionating small grains (e.g. barley and oat) into separate components/fractions enriched with beta-glucan (BG), proteins, starch, and/or other fibers and to recover these major nutrients simultaneously. It also relates to methods for pre-fractionating small grains into protein and beta-glucan fractions before subjecting the remaining grain biomass to an ethanol production system as feedstock. In an exemplary embodiment, the protein fractions produced using the disclosed processes comprise a high quality, highly digestible protein that is suitable for use as an aquaculture feed.

BACKGROUND OF THE INVENTION

Small grains are important cereals for human consumption. However, at present, a significant portion of annual production of small grains is consumed as livestock feed. Small grains contain valuable components such as starch, protein, and dietary fibers. Furthermore, some exemplary small grains, such as barley and oats, contain high amounts (3-8%) of mixed linkage 1-4, 1-3 beta-D-glucan, commonly known as beta-glucan (BG). Because of its unique chemical structure, BG is water-soluble and has become one of the most important dietary fibers for human health. Medical research has shown that BG has hypocholesterolemic effects. Thus in recent years, there is a growing interest in incorporating barley and oats into the human diet since they are naturally healthy, readily available and relatively inexpensive. Unfortunately, unlike wheat and rice, direct consumption of barley and oats as food is typically limited due to lack of certain functionality and palatability.

However, the components of BG, protein, starch, and other fibers in barley and oats have many food uses as well as non-food uses. Thus, there remains a strong and continued industry interest for processing barley and oats into fractions with unique composition. In particular, there is considerable interest in producing fractions enriched in BG, protein, starch, and/or other fibers.

Numerous publications in scientific journals have described various ways to process barley and oats into fractions enriched with BG, protein, starch and/or other fibers. Basically these methods can be grouped into two major categories: dry fractionation and wet extraction. Dry methods include pearling, milling, sieving, air classification or a combination (see e.g., Liu et al. 2009, J. Food Sci. 74:C487-499). Wet methods typically involve solvent extraction, screening or centrifugation, and precipitation.

BG is typically extracted from barley and oats with a solvent and then precipitated by mixing with an alcohol (see e.g., U.S. Pat. No. 5,518,710). Sometimes, certain enzymes (such as amylase and protease) are also used to boost BG recovery (see e.g., U.S. Pat. No. 5,518,710). Wet methods to isolate starch from barley are also available (Andersson et al. 2001, Cereal Chem. 78:507-513). Protein is generally extracted with an alkaline solution and precipitated in acidic conditions (Cluscky et al. 1973, Cereal Chem. 50:475-481).

Compared with wet methods, dry methods are cost effective but suffer with low enrichment levels. Therefore, for production of valuable ingredients with high levels of nutrient enrichment, wet extraction becomes a method of choice. However, almost all reported studies on fractionating barley or oats by wet methods focused on enrichment of either BG or protein and starch. See e.g., U.S. Pat. No. 4,028,468; U.S. Pat. No. 5,013,561; U.S. Pat. No. 5,082,673; U.S. Pat. No. 5,169,660; U.S. Pat. No. 5,183,677; U.S. Pat. No. 5,312,636; U.S. Pat. No. 5,512,287; U.S. Pat. No. 5,518,710; U.S. Pat. No. 5,846,590; U.S. Pat. No. 6,113,908; U.S. Pat. No. 6,197,952; U.S. Pat. No. 6,426,201; U.S. Pat. No. 7,138,519; U.S. Pat. No. 7,566,470. Unfortunately, these methods have limited commercial feasibility due to high cost of recovering only one or two components, leading to low production profitability.

In another development, in recent years, there has been an increase in the demand for ethanol as a fuel additive to decrease the dependency on fossil fuels. This has resulted in a dramatic increase in the demand for starchy grains that can be used for ethanol production. In the U.S. corn is the primary feedstock for fuel ethanol production. In order to avoid the fuel versus food issue, an alternative to corn feedstock is needed. Among others, barley and oats have a great potential as alternative feedstocks for ethanol production.

Unfortunately, ethanol production from barley and oats, is limited by the relatively high content of BG in these grains; The presence of BG not only makes mashes viscous and difficult to handle, but also ends up in the co-product, dried distillers grains with solubles (DDGS), which presents a problem for its use as animal feed. Typically this problem is addressed by adding a BG hydrolyzing enzyme, beta-glucanase, to the production system, so that beta-glucan is converted to glucose. This is reported in a patent application, (see e.g., WO, 2008/1122282). However, the drawback of this approach is that the valuable beta-glucan is not recovered for other uses.

Given the above, what is clearly needed in the art are methods that provide an efficient process for simultaneously enriching BG, protein, starch, and other valuable components from small grains and producing multiple value-added fractions, each enriched with one or more valuable components; methods by which a beta-glucan-enriched fraction can be separated from BG-containing grains (such as barley and oats) before subjecting the rest of biomass to an ethanol production system; and methods for separating proteins out of small grains (such as barley and oats) before subjecting the rest of biomass to an ethanol production process.

Fortunately, as will be clear from the following disclosure, the present invention provides for this and other needs.

SUMMARY OF THE INVENTION

In one aspect, the invention provides a method for processing small grains to provide four separate nutrient fractions wherein the fractions are: a protein enriched fraction, a starch enriched fraction, a beta-glucan enriched fraction and a fiber enriched fraction, the method comprising: (a) grinding the small grain to provide a flour, (b) mixing the flour with an alkaline solution to a pH range of 8.00-12 to provide an alkalized mixture; (c) centrifuging the alkalized mixture to provide a supernatant as a saved liquid fraction and a precipitate comprising fiber and starch; (d) mixing the precipitate with water or a solvent to form a resuspended precipitate; (e) pouring the resuspended precipitate over a screen to produce a solid fraction on top of the screen, and a liquid underpass under the screen; (f) collecting the solid fraction on the top of the screen to produce a fiber fraction, (f) collecting the liquid underpass; (g) centrifuging the liquid underpass to provide a starch fraction and a supernatant; (h) combining the supernatants from step (g) and the saved liquid fraction from step (c) to provide a combined supernatant; (i) adding an acid to the combined supernatant to bring pH of the combined supernatant to between about pH 3.75 to about pH 6.50 thereby providing an acidified combined supernatant; (j) centrifuging the acidified combined supernatant to provide a beta-glucan supernatant and a precipitate comprising protein; (k) collecting the precipitate comprising protein to provide a protein fraction; (l) adding an alcohol to the beta-glucan supernatant to precipitate beta-glucan; (m) centrifuging the precipitated beta-glucan to recover the beta-glucan as a beta-glucan fraction; thereby processing small grains to provide four separate nutrient fractions wherein the fractions are: a protein enriched fraction, a starch enriched fraction, a beta-glucan enriched fraction and a fiber enriched fraction. In one exemplary embodiment, prior to step b, the flour is defatted. In one exemplary embodiment, the flour is defatted with hexane or other organic solvent. In one exemplary embodiment, the small grain is a member selected from the group consisting of barley and oats. In another exemplary embodiment, the disclosure provides a protein enriched fraction, a starch enriched fraction, a beta-glucan enriched fraction and a fiber enriched fraction made by the method of claim 1.

In another aspect, the disclosure provides a method for processing small grains to provide four separate nutrient fractions wherein the fractions are: a protein enriched fraction, a starch enriched fraction, a beta-glucan enriched fraction and a fiber enriched fraction, the method comprising: (a) grinding the small grain to provide a flour, (b) mixing the flour with an alkaline solution to a pH range of 8.00-12 to provide an alkalized mixture; (c) pouring the alkalized mixture over a screen to produce a solid fraction on top of the screen and a liquid underpass below the screen; (d) collecting the solid fraction on top of the screen to produce a fiber fraction; (e) collecting the liquid underpass (f) centrifuging the liquid underpass to provide a precipitate as a starch fraction and a supernatant; (g) collecting the starch fraction; (h) adding an acid to the supernatant to bring the pH of the supernatant to a pH that is between about 3.75 to about 6.50, thereby providing an acidified supernatant; (i) centrifuging the acidified supernatant to provide a beta-glucan supernatant and a precipitate comprising protein; (j) collecting the precipitate comprising protein as a protein fraction; (k) adding alcohol to the beta-glucan supernatant to precipitate beta-glucan; (l) centrifuging the precipitated beta-glucan to recover the beta-glucan as a beta-glucan fraction; thereby processing small grains to provide four separate nutrient fractions wherein the fractions are: a protein enriched fraction, a starch enriched fraction, a beta-glucan enriched fraction and a fiber enriched fraction. In an exemplary embodiment, the disclosure provides a protein enriched fraction, a starch enriched fraction, a beta-glucan enriched fraction and a fiber enriched fraction made by the method.

In another aspect the disclosure provides a method for processing small grains to provide three separate nutrient fractions wherein the fractions are: a protein enriched fraction, a starch enriched fraction, and a beta-glucan enriched fiber fraction, the method comprising: (a) grinding the small grain to provide a flour, (b) mixing the flour with water to provide an aqueous mixture; (c) pouring the aqueous mixture over a screen to produce a solid fraction on top of the screen and a liquid underpass below the screen; (d) collecting the solid fraction on top of the screen to produce a beta-glucan enriched fiber fraction; (e) collecting the liquid underpass; (f) mixing the liquid underpass with an alkaline solution to a pH range of 8.00-12 to provide an alkalized mixture; (g) centrifuging the liquid underpass to provide a precipitate as a starch fraction and a supernatant; (h) collecting the starch fraction; (i) adding an acid to the supernatant to bring the pH of the supernatant to a pH that is between about 3.75 to about 6.50, thereby providing an acidified supernatant; (j) centrifuging the acidified supernatant to provide an acidified supernatant and a precipitate comprising protein; (k) collecting the precipitate comprising protein as a protein fraction; thereby processing small grains to provide three separate nutrient fractions wherein the fractions are: a protein enriched fraction, a starch enriched fraction, and a beta-glucan enriched fiber fraction. In one exemplary embodiment, the disclosure provides a protein enriched fraction, a starch enriched fraction, a beta-glucan enriched fraction and a fiber enriched fraction made by the method.

In another aspect, the disclosure provides a method for processing small grains to provide a protein enriched fraction, a beta-glucan enriched fraction, a starch enriched fraction, and a fiber enriched fraction, the method comprising: (a) grind grains into flour; (b) mix the flour with water and centrifuge; (c) add an alcohol to the supernatant, centrifuge, and collect the precipitate as a BG fraction; (d) mix the precipitate of Step (c) with an alkaline solution at a pH range of 8.00-11.50 and centrifuge; (e) mix the precipitate with water, screen the slurry, and collect the material on the top of the screen as a fiber fraction; (f) centrifuge the filtrate and collect the precipitate as a starch fraction; (g) combine the supernatants from Steps (d) and (f), add an acid to the mixture to bring pH of the mixture to 3.75-6.50, centrifuge, and collect the precipitate as a protein fraction. In one exemplary embodiment, the disclosure provides protein enriched fraction, a beta-glucan enriched fraction, a starch enriched fraction, and a fiber enriched fraction made by the method.

In another aspect, the disclosure provides a method for processing small grains to provide a protein enriched fraction, a beta-glucan enriched fraction and feedstock for ethanol production, the method comprising: (a) grinding the small grain to provide a flour, (b) mixing the flour with an alkaline solution having a pH of between about 8 to about pH 12 to provide an alkalized mixture; (c) centrifuging the alkalized mixture to provide a supernatant and a precipitate; (d) adding acid to the supernatant to bring the pH to between about 3.75 to about 6.5 to provide an acidified supernatant; (e) centrifuging the acidified supernatant to provide a precipitate comprising protein and a beta-glucan supernatant; (f) adding alcohol to the beta-glucan supernatant to provide an alcoholized supernatant, wherein beta-glucan has at least begun to precipitate; (g) centrifuging the alcoholized supernatant to remove the beta-glucan precipitate; (h) evaporating the alcoholized supernatant to recover the alcohol; (i) mixing the evaporated supernatant with the precipitate from step (c) to provide a feedstock for dry grind ethanol process. In one exemplary embodiment, the disclosure provides a protein enriched fraction, a beta-glucan enriched fiber fraction and a feedstock for dry grind ethanol process made by the method.

In another aspect, the disclosure provides a method for processing small grains to provide a protein enriched fraction and feedstock for ethanol production, the method comprising: (a) grinding the small grain to provide a flour, (b) mixing the flour with an alkaline solution having a pH of between about 8 to about pH 12 to provide an alkalized mixture; (c) centrifuging the alkalized mixture to provide a first supernatant and a first precipitate; (d) adding acid to the first supernatant to bring the pH to between about 3.75 to about 6.5 thereby providing an acidified supernatant; (e) centrifuging the acidified supernatant to provide a second precipitate comprising protein and a second supernatant comprising beta-glucan; (f) collect the second precipitate as a protein fraction; (g) Mixing the second supernatant with the first precipitate from step (c) to provide a feedstock for dry grind ethanol process. In one exemplary embodiment, the disclosure provides a protein enriched fraction, and a feedstock for dry grind ethanol process made by the method.

In another aspect, the disclosure provides a method for processing small grains to provide a beta-glucan enriched fiber fraction and feedstock for ethanol production, the method compromising of (a) grinding the small grain to provide a flour, (b) mixing the flour with water to provide an aqueous mixture; (c) pouring the aqueous mixture over a screen to produce a solid fraction on top of the screen and a liquid underpass below the screen; (d) collecting the solid fraction on top of the screen to produce a beta-glucan enriched fiber fraction; (e) collecting the liquid underpass to provide a feedstock for dry grind ethanol process. In one exemplary embodiment, the disclosure provides a beta-glucan enriched fiber fraction and a feedstock for dry grind ethanol process made by the method.

Other features, objects and advantages of the invention will be apparent from the detailed description which follows.

DETAILED DESCRIPTION OF THE INVENTION

Definitions

Figure 1:
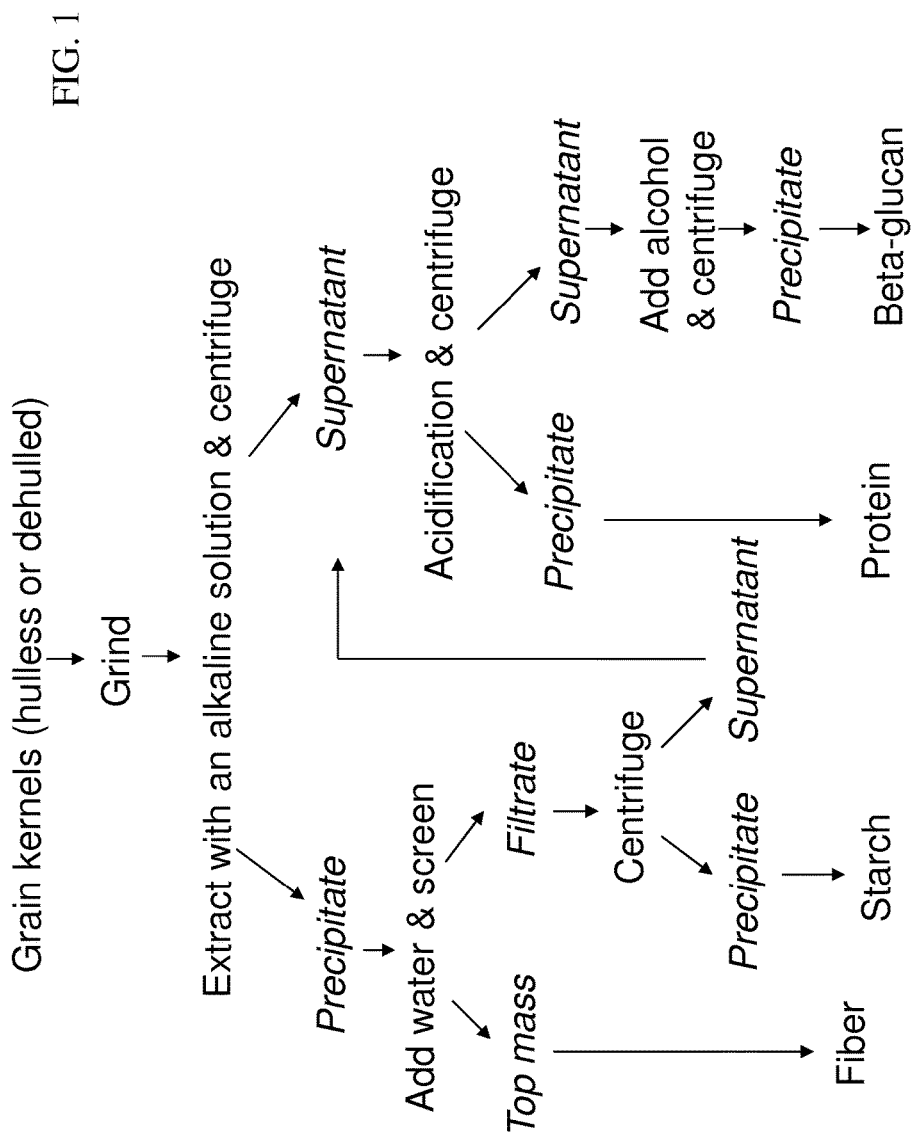
FIG. 1. A flow diagram showing the method for fractionating grains in accordance with the invention FIG. 2. A flow diagram showing an alternative method for fractionating grains by screening alkaline slurry first.

The term "small grain" as used herein refers to grains that provide sources of carbohydrate, typically in the form of starch. Thus, in some exemplary embodiments a "small grain" is a "starchy grain". Exemplary "small grains" include, but are not limited to cereal grains and seeds or "pseudocereals". The term "cereal grain" is used conventionally herein and refers generally to the edible grain of the members of the grass family. Exemplary cereal grains from grass family plants include but are not limited to e.g., corn, oats, barley, wheat, rice, rye, sorghum, millet, triticale etc. Exemplary "grains" from seeds or "pseudocereals" include, but are not limited to e.g., quinona, buckwheat, amaranth, etc.

The expression "ethanol production processes" as used herein, refers to fermentation ethanol processes based on starch, cellulose or sugar-based feedstocks as known in the art and disclosed herein. In an exemplary embodiment, "ethanol production processes" are fuel ethanol production processes.

The term "co-product" as used herein refers generally to a second product produced as a result of or in conjunction with the manufacturing of a different first product.

The term "slurrying" as used herein, refers to combining a solid or semi solid substance with a liquid and mixing to form a more or less homogeneous mixture. Thus, the phrase "slurrying the ground small grain" refers to mixing the ground small grain e.g., ground dehulled barley, with a liquid e.g., water, to form a more or less homogeneous mixture.

The term "fermentation" as used herein refers to the conversion of a "fermentation substrate" e.g., a carbohydrate e.g., a starch, sugar, etc, into a "fermentation product", e.g., an acid or an alcohol. In an exemplary embodiment, fermentation utilizes a fungus to convert a sugar into an alcohol. In another exemplary embodiment, fermentation utilizes a bacterium to convert a sugar into an acid. In another exemplary embodiment, fermentation is carried out in an anaerobic environment. In still another exemplary embodiment, fermentation is carried out in an aerobic environment.

The term "fermentation product" as used herein, refers to a substance or product that is produced by fermentation. In an exemplary embodiment a fermentation product is an alcohol e.g., ethanol, methanol, butanol. In another exemplary embodiment, a fermentation product is an antibiotic e.g., penicillin. In another exemplary embodiment a fermentation product is an amino acid. In another exemplary embodiment, a fermentation product is an organic acid e.g., lactic acid, acetic acid, citric acid.

The expression "simultaneous recovery" as used herein, refers to recovery of all major nutrients into fractions from the same initial staring material through one processing method with multiple steps.

The term "beta-glucan" or the abbreviation "BG" as used herein refers to a carbohydrate compound having the formula $(C_6H_{10}O_5)_n$, where the subscript "n" denotes the total number of glucose monomer units with the glucose monomer units linked by beta 1-4 and 1-3 mixed linkages.

The term "nutrient" as used herein, refers to a substance or matter that when taken into a living organism serves to sustain the organism in its existence, by promoting growth, replacing loss, and providing energy. Nutrients can be taken into an organism by whatever means that an organism typically uses to take in nutrients e.g., plants typically absorb nutrients through their roots and leaves. Animals typically take in nutrients through ingestion of solid food and liquids.

The term "enriched" as used herein, refers to the status of a nutrient in a composition. A nutrient is "enriched" when it is present in a composition at a concentration that is higher than the concentration of the nutrient in the starting material. Thus, in an exemplary embodiment, a grain fraction containing a nutrient that is higher in concentration than the nutrient in the starting material is said to be "enriched" for that nutrient.

The term "agriculture" as used herein, refers broadly to human cultivation of plants and animals. Thus, "agriculture" as used herein, encompasses all aspects of plant cultivation and animal husbandry.

The term "livestock" as used herein refers to one or more domesticated animals raised in an agricultural setting typically, though not necessarily, for the production of food, fiber, or labor. Exemplary livestock species include, but are not limited to cattle, swine, sheep and poultry e.g., chickens, turkeys, guinea fowl, ducks, game birds, fish etc, that are reared or kept in captivity for breeding, the production of meat or eggs, or for restocking supplies of game.

The term "aquaculture" as used herein, refers to the farming of aquatic organisms e.g., fish, mollusks, crustaceans etc, with some sort of intervention in the rearing process to facilitate production, e.g., regular stocking, feeding, protection from predators, etc I. Introduction: Fractionation of Small Grains into Nutrient-Enriched Fractions and Simultaneous Recovery In an exemplary embodiment, the invention provides methods for the fractionation and simultaneous recovery of beta glucan, protein, starch and fiber, from small grains e.g., barley, oats, etc. Typically, the methods comprise extraction, solid-liquid separation, acidification, alcohol precipitation, washing, and drying. A detailed description follows.

II. Production of Nutrient-Enriched Fractions from Small Grains

A. Grains

Barley

Barley is an exemplary small grain. Barley is a short-season, early maturing crop that is grown commercially in both irrigated and in dry land environments. Barley is resistant to drought, flood and frost it thus adapts well to many different types of growing environments. Because of its adaptability and the ability to tolerate a wide range of environmental conditions, barley can be grown in many regions of the world where it may be difficult or impossible to grow other types of cereal grain.

In an exemplary embodiment, the process disclosed herein for producing nutrient-rich fractions from small grains utilizes barley. Any barley variety e.g., hulled or hulless (see e.g., Cereal Chemistry 76: 589-599) can be used.

In one exemplary embodiment, the process utilizes a hulled barley variety. "Hulled" or equivalently "covered" barley varieties produce kernels with a tough inedible outer hull. Typically, the tough outer hull or husk is removed before use in the methods disclosed herein. "Dehulled barley" is prepared by any method known in the art (e.g., using a vertical sheller) and refers to barley kernels that have had their outer hull removed, but which still have germ and the outer layer of bran. Thus, in one exemplary embodiment, hulled barley kernels are first dehulled using standard techniques well known in the art.

"Dehulled" barley can be further processed to remove the bran layer and thereby provide a barley referred to in the art as "pearled barley". In one exemplary embodiment, "pearled barley" is processed by the methods disclosed herein. However, in this embodiment, the pearling process removes some of the protein that could otherwise be recovered using the methods disclosed herein.

In one exemplary embodiment, the barley is a hulless variety of barley. Hulless barley is typically used without dehulling prior to use. In one exemplary embodiment, the hulless barley variety is Merlin.

Thus, barley processed as disclosed herein, is suitable for use in aquaculture feeds.

Oat

Oat is an exemplary small grain. Common oat (*Avena sativa*) is a species of cereal grain grown for its seed. Oats typically grow in temperate regions. They have a lower summer heat requirement and greater tolerance of rain than other cereals, such as e.g., wheat, rye or barley. Accordingly, oat can be successfully grown in areas with cool, wet summers. Oats are an annual plant, and can be planted either in autumn (for late summer harvest) or in the spring (for early autumn harvest).

Other Small Grains

Other grains can be used to prepare nutrient enriched fractions by the disclosed processes. In one exemplary embodiment the small grain is wheat. In another exemplary embodiment, the small grain is rye. In still other exemplary embodiments the small grain is a member selected from the group consisting of millet, sorghums and triticale.

B. Fractionation of Small Grains to Produce Nutrient Enriched Fractions Recovered Simultaneously In an exemplary embodiment, the methods disclosed herein simultaneously recover fractions enriched in one or more of four key nutrients, BG, protein, starch and fiber. Typically, in general, the methods disclosed herein comprise: extraction, solid-liquid separation, acidification, alcohol precipitation, washing, and drying.

Starting Material

The starting material can be any starchy grain. In some exemplary embodiments the staring material is barley. In other exemplary embodiments the staring material is oat. Both hulled and hulless varieties can be used. For hulled kernels, dehulling is used to remove hulls. For any methods of the invention, the first step is the particle size reduction. The particle size of kernels is reduced to 0.5 mm or less by any grinder or mill. Some grains, such as oat, contain higher oil content than most others. Thus, in exemplary embodiments, ground grains are defatted with hexane or other organic solvents to recover the valuable oil fraction and to boost nutrient purity or recovery rate in a particular fraction. Defatting is known in the art (see e.g., U.S. Pat. No. 4,496,599).

Alkaline Extraction

The ground grain is mixed with water in a ratio of solvent to flour that is typically in a range that is between about 4:1 to about 20:1. In an exemplary embodiment a mechanical mixer is used for mixing although any method which thoroughly mixes the solvent and flour can be used. The pH of the slurry is adjusted to a range that is between about pH 8.00 to about pH 12.00 with an alkaline solution, e.g. 2N NaOH or 2N KOH. Thus, in some exemplary embodiments, the pH of the slurry is adjusted to pH 8, pH 8.5, pH 9, pH 9.5, pH 10, pH 10.5, pH 11, pH 11.5, pH 12. The final concentration of NaOH in the slurry is typically between 0 to 0.2N. Alternatively, a dilute alkaline solution, such as 0.035N NaOH solution is prepared first before ground grains are added and mixed. The composition is mixed to achieve a homogeneous mixture. Typically, mixing time ranges from about 5 min to 2 hours. In an exemplary embodiment, a mechanical mixer is used on low speed, e.g., 100 RPM. In this embodiment, mixing takes about 30 minutes to about 1 hr. The extraction temperature ranges from 5° C. to 60° C. In most cases, room temperature extraction is used.

Solid-Liquid Separation

Following alkaline extraction, the alkaline slurry of grains is subject to solid-liquid separation. Common means include filtration and centrifugation. In one exemplary embodiment, see e.g., FIG. 1, centrifugation of the slurry is carried out at a relative centrifugal force of 1000-10000×g for a duration typically ranging from between about 5 minutes to about 30 minutes until the solution has separated into liquid and solid fractions.

The liquid fraction is saved to provide a saved liquid fraction and the precipitate, which contains mainly starch and cell wall fiber, is mixed with a solvent in a solvent to flour (original dry flour) ratio that is typically between about 4:1 to about 20:1, with the mechanical mixer. In some exemplary embodiments, the solvent is water. In other exemplary embodiments, the solvent is a dilute alkaline solution, as used for the initial extraction described above. In still other exemplary embodiments, a dilute acid or salt solvent is used. In still other exemplary embodiments, the solvent is a supernatant from one of other steps. Solvent extraction serves two purposes: 1) help filtering starch out and 2) at the same time, extract more BG and protein. Thus, suspension of the precipitate helps extract more BG and protein and separation of starch by screening. The suspension is put on a screen that has a mesh size with a diameter that is typically between about 53 micrometers to about 300 micrometers (U.S. standard mesh size No. 270-50). The material remained on the screen, known as top mass or overpass, is collected and dried as a fiber fraction. The material that passes through the screen (known as filtrate or underpass) is then centrifuged.

The precipitate from the centrifugation is dried to become a starch fraction. The supernatant is combined with the supernatant comprising the saved liquid fraction from centrifuging the alkaline slurry. The resulting the mixture is subjected to acidification, the next step, which is disclosed below.

Figure 2:
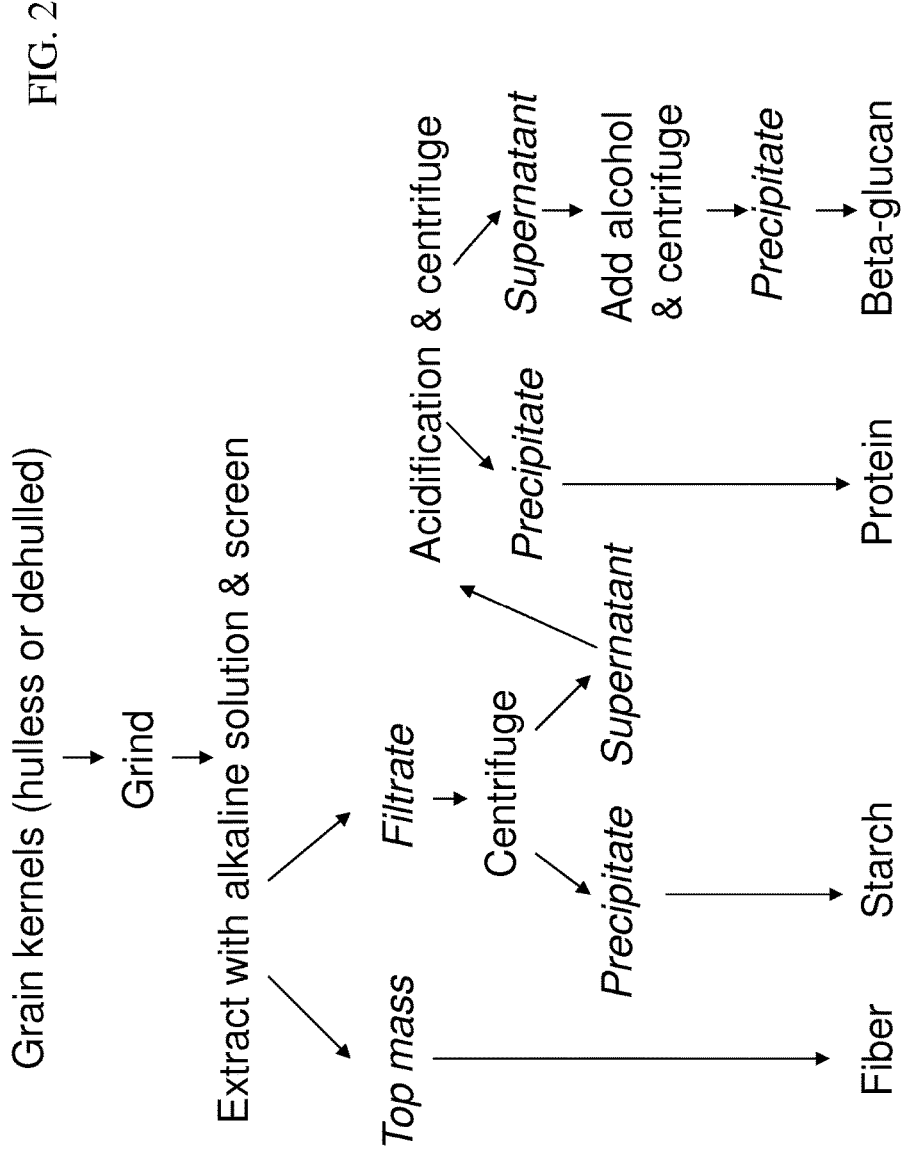

In another exemplary embodiment (see e.g., FIG. 2), the alkaline slurry can go through a screen having a mesh size with a diameter of 53-300 micrometers (U.S. standard mesh size No. 270-50). The top mass is collected and dried as a fiber fraction. The filtrate is then centrifuged. The precipitate is dried to become a starch fraction, while the supernatant is directly subjected to acidification.

Acidification

The above supernatant or mixture of supernatants is acidified by adjusting pH to a range of 3.75-6.50, with an acid solution, such as e.g., 2N HCl. The resulting mixture is stirred until thoroughly mixed which typically takes a few minutes to half hour. The resulting mixture is then subjected to centrifugation. The precipitate is collected, washed with water or neutralized, and finally dried as a protein fraction.

In an exemplary embodiment, the recovered protein fraction is dried. In another exemplary embodiment, before drying, the protein fraction is subjected to a heat treatment at a temperature higher than 80° C. for a few minutes to a few hours. A heat treatment includes boiling, steaming, autoclaving, jet cooking, roasting, microwaving, etc. A heat treatment can also be a part of the drying step.

Alcohol Precipitation

The supernatant obtained from the above acidification step contains beta-glucan (BG). The supernatant comprising the beta-glucan is mixed with an alcohol. Although any alcohol would work, in an exemplary embodiment, the alcohol is ethanol. In some exemplary embodiments the alcohol is 95% ethanol. In other exemplary embodiments, the alcohol is absolute ethanol. The final concentration of the alcohol in the mixture is typically between about 25% to about 75%, depending on the concentration of BG in the initial supernatant. Typically, lower BG concentration in the solution utilizes a higher alcohol concentration. Alcohol precipitates most BG when a proper concentration of alcohol in the final mixture is reached. Typically, the solution becomes cloudy with alcohol addition, and within a few minutes, precipitates fall out. The process takes just a few minutes. After precipitation, the mixture is centrifuged and the precipitate is collected and dried as a BG fraction. The new supernatant is evaporated to recover the alcohol. Alternatively, to reduce the amount of alcohol used for precipitation, the supernatant obtained from the above step is concentrated first by evaporation.

Water Extraction

Figure 3:
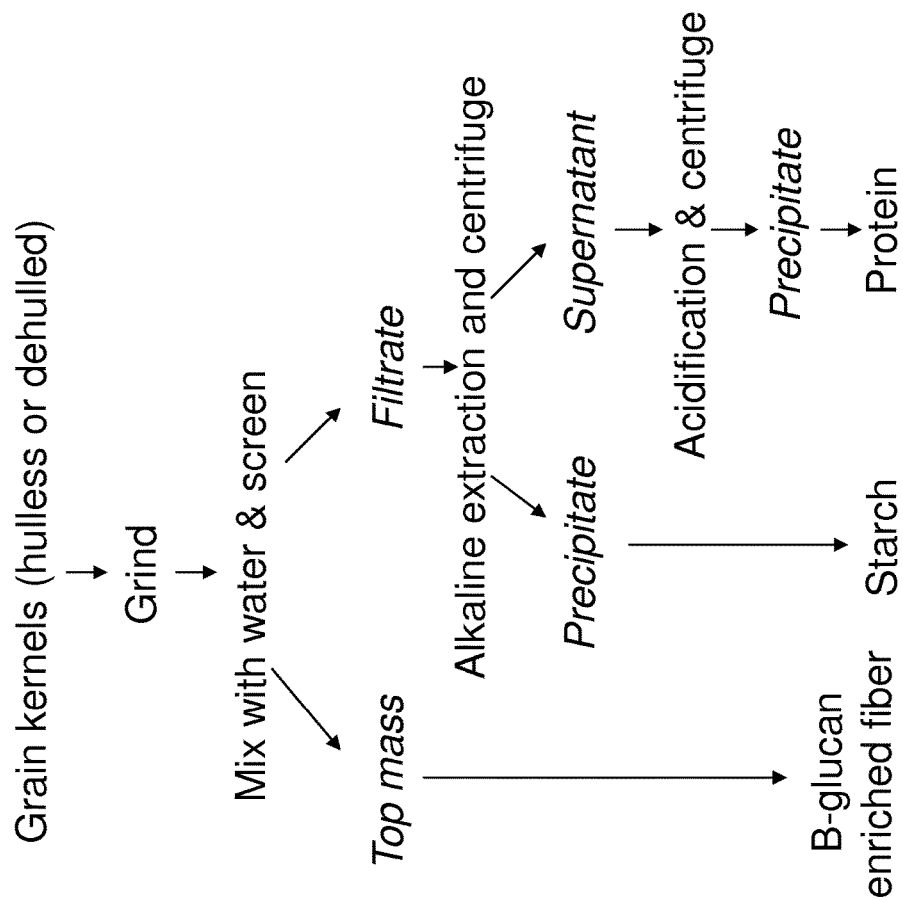
FIG. 3. A flow diagram showing an alternative method for fractionating grains by removing beta-glucan enriched fiber first.
Figure 4:
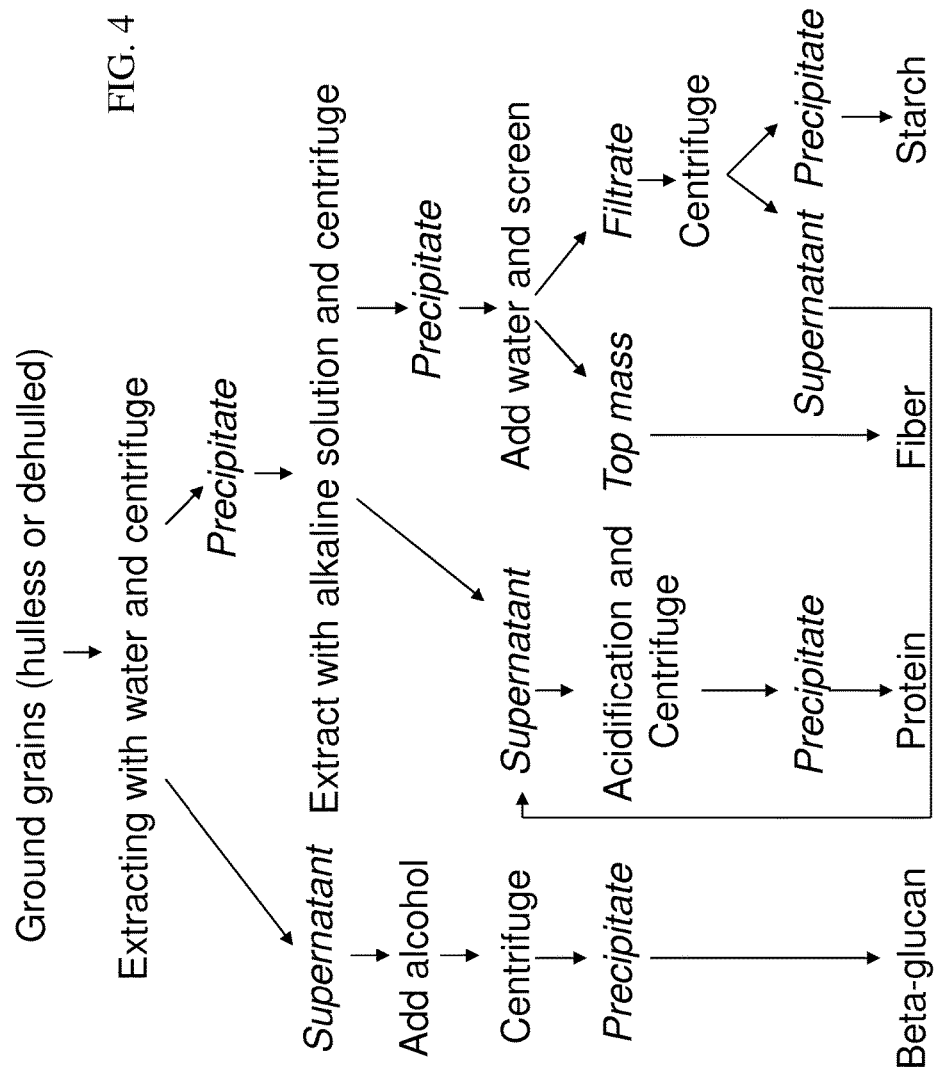
FIG. 4. A flow diagram showing an alternative method for fractionating grains by water extraction of beta-glucan followed by alkaline extraction of protein.

By different embodiments, water, instead of dilute alkaline, is used to slurry the ground grains. In an exemplary embodiment (see e.g., FIG. 3), water to flour ratio ranges from 4:1 to 20:1. The extraction temperature is room temperature or lower. The duration of extraction is 30 min or less. Immediately after water extraction, the slurry is screened and the top mass is collected and dried as a BG-enriched fiber fraction. The filtrate undergoes an alkaline extraction similar to the procedure disclosed in FIG. 1. In another embodiment (FIG. 4), water to flour ratio ranges from 4:1 to 20:1. The extraction temperature is room temperature. The duration of extraction is typically 30 min or less. The water slurry is centrifuged. BG in the supernatant is precipitated with an alcohol and recovered, while the precipitate is undergoing alkaline extraction similar to the procedure described in FIG. 1.

III. Applications of Value-Added Fractions

In exemplary embodiments, the fractions obtained from grains, such as e.g., barley and oats, as disclosed herein, serve as valuable food, feed, nutraceutical and/or industrial ingredients. In exemplary embodiments, purified BG has applications as a food (e.g., a functional food), pharmaceutical and/or cosmetic.

In some exemplary embodiments, the fractionated starch from barley and oats shows comparable functionality (e.g., thickening, gelling, paper making qualities, acid/enzyme resistance, etc.) to corn starch, which is currently used extensively for various food and industrial applications. Therefore, barley and oat starch can substitute cornstarch in the preparation of many existing food and industrial products (i.e. modified food starches, cationic or amphoteric starches for paper industry, dextrins for food and paper industry, adhesives, acid cut starches, etc.). Starch can also be used as a substrate for industrial ethanol production.

As for protein, there is a constant worldwide demand for less expensive proteins with good nutritional and functional properties. Compared to other plant proteins, barley and oats provide a relative cheap source of proteins. Furthermore, their proteins do not contain antinutrienal factors found in some other plant protein sources. Thus, protein concentrates and isolates from barley and oats have a potential as alternative proteins for human food and animal feed. As a feed, barley and oat protein concentrates made by the methods of this disclosure can be an excellent protein source as fish feed. Global aquaculture now uses more than $4 billion of aquaculture feed per year.

IV. Aquaculture

Aquaculture is the fastest growing food production sector in the world. For example, the current value of US aquaculture production is near $900 million annually, the US Department of Commerce hopes to increase this to $5 billion by 2025. Thus, Aquaculture is truly the next agricultural revolution because of the great changes it is generating in the production of shellfish and finfish products.

For aquaculture to continue its growth, improved sources of plant based protein, are needed. A primary objective in diet formulation for fish is to provide a nutritionally balanced mixture of ingredients to support the maintenance, growth, reproduction, and health of the animal at an acceptable cost. Many of the nutrient requirements of fish and aquaculture nutrition are known in the art see e.g., *Nutrient Requirements of Fish*, Committee on Animal Nutrition, Board on Agriculture, National Research Council, NATIONAL ACADEMY PRESS, Washington, D.C. 1993 National Academy of Sciences 1. Aquaculture Feed Processing As is well known in the art, fish feeds are typically processed into water-stable, particulate forms (granules, pellets) for efficient consumption by the fish and to minimize fouling of the water. Most manufactured fish feed is processed by compression pelleting or extrusion; other manufactured forms include moist (or semimoist), microencapsulated, and micropulverized feeds. These processes are well known in the art.

Fish meal has been a primary protein source in trout feeds and any changes that can reduce fish meal levels and total costs are beneficial. Replacing fish meal with plant protein is a first step, but amino acid content of plant based diets can be limiting. Amino acids are needed for many metabolic functions, the largest being protein accretion and metabolic fuel. Providing the proper dietary amino acid balance will reduce feed costs and nitrogenous waste output as ammonia.

Complete replacement of fish meal protein with plant protein without a reduction in growth has been the goal of many studies (see e.g., Adelizi P. D., et al, supra). However, as is known in the art, protein source affects growth rate (see e.g., F. T. Barrows, et al. (2007) Aquaculture Research 38 (16):1747-1758).

Feed acceptability, palatability and digestibility vary with the ingredients and feed quality. Fish farmers pay careful attention to feeding activity in order to help determine feed acceptance, calculate feed conversion ratios and feed efficiencies, monitor feed costs, and track feed demand throughout the year.

Published feeding rate tables are available for most commonly cultured fish species. Farmers can calculate optimum feeding rates based on the average size in length or weight and the number of fish in the tank, raceway, or pond by methods known in the art (see Hinshaw 1999, and Robinson et al. 1998). Farmed fish typically are fed 1-4% of their body weight per day depending on fish size, water temperature and species.

2. Aquaculture Feeding Practices

Typically, different sizes and species of fish and the diverse environmental and management conditions used in aquaculture require different feeding strategies. Diet characteristics, such as source (living or nonliving feed), particle size, texture, density, and palatability, must be carefully considered for size and species of fish. Feed allowance and frequency of feeding are important for growth rate and feed efficiency. Type of feed (floating or sinking) used and method of feeding will depend on the fish, the culture system, and the equipment and personnel available.

V. Ethanol Production

Ethanol is produced from the liquid fermentation stream by methods known in the art (see e.g., Gyamerah, M. and Glover, J. (1996) J. of Chem. Tech. and Biotech. 66(2):145-152; Minier M. and Coma, G (1981) *Biotechnology Letters* 3(8):405-408; P. Christen et al. (1990) Biotechnology and Bioengineering 36(2):116-123).

Fuel ethanol production in the United States and elsewhere is a growing industry. In 2011, the U.S. ethanol plants converted 5.0 billion bushels (127 million metric tons) of corn (about 40% of total U.S. supply) into an estimated 13.9 billion gallons (52 billion liters) of ethanol and 39 million metric tons of co-products as livestock feed, including distillers dried grains with solubles (DDGS), corn gluten feed and corn gluten meal (Renewable Fuel Association). Of that production, over 90% of ethanol facilities in the U.S. employed some variation of the dry-grind processing.

Figure 5:
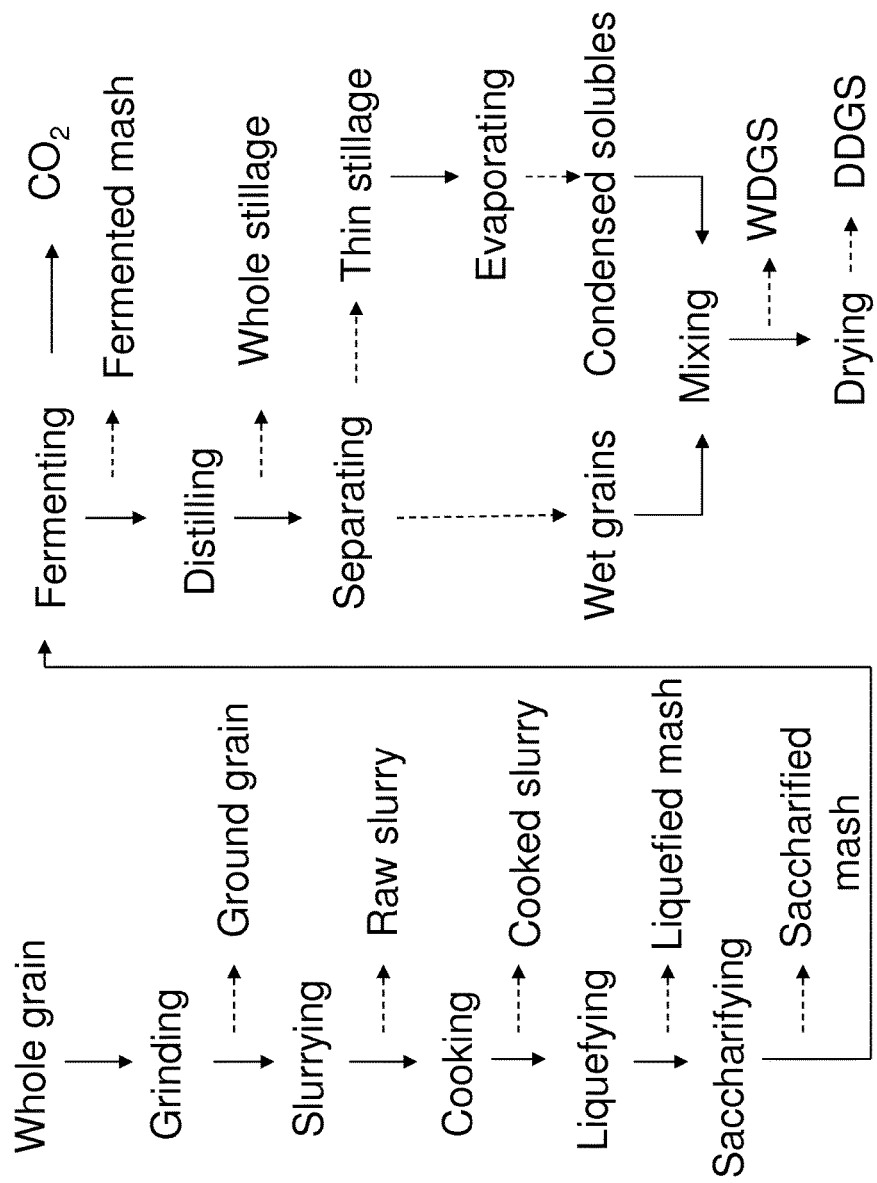
FIG. 5. A flow diagram showing a dry grind method for making ethanol from starchy grains.

The dry grind process typically produces high ethanol yields, and offers flexibility to produce different kinds of primary products and co-products. A known dry grind process is illustrated e.g., in FIG. 5. In dry-grind processing, the whole grain is dry ground, and the starch in grain flour is converted into ethanol and carbon dioxide, while the rest of grain constituents (protein, lipids, fiber, minerals, and vitamins) are relatively unchanged chemically, but concentrated (see e.g., Liu, K. 2011, J. Agric. Food Chem. 59:1508-1526).

After the ethanol is distilled off, the remaining material constitutes an intermediate co-product known as whole stillage, which comprises about 85-90% water. Horizontal dewatering centrifuges are typically used for removing a portion of the suspended solids from whole stillage by splitting the stream into two fractions, a solid fraction and a liquid stream. The solid fraction, known as distillers wet grains (DWG) or wet cake. The liquid stream from the dewatering device, known as thin stillage, typically contains 5-10% solids by weight, is evaporated to become a syrup-like material known as condensed distillers solubles (CDS) with a solids content of 20 to 50% by weight. CDS is difficult to dry and typically blended with DWG to become distillers wet grains with soluble (DWGS), which is then dried to produce an animal feed at about 88% solids, commonly referred to as distillers dried grains with solubles (DDGS).

At present, corn is the major feedstock for fuel ethanol production. The major process is the dry grind method. The major co-product, the only one actually, is DDGS. In order to increase values of fuel ethanol co-products and thus boost profitability of fuel ethanol plants, there are methods to pre-fractionate corn to remove germ and/or fiber (see e.g., U.S. Pat. No. 6,899,910; U.S. Pat. Application 20100206780).

Small grains, such as barley, oats and wheat, can provide an alternative feedstock to corn for fuel ethanol production. However, since corn and small grains have different composition and seed structure, not only the dry grind method needs to be modified to have efficient ethanol production when small grains are used, but also the methods to pre-fractionate corn do not apply to small grains readily. For example, barley and oat contain beta-glucan, while corn contains little. One major constraint that limits use of barley and oat as feedstock of ethanol production is the relatively high content of BG in these grains. As discussed above, the presence of BG not only makes mashes viscous and difficult to handle, but also ends up in the co-product, dried distillers grains with solubles (DDGS), which presents a problem for its use as animal feed. One approach to solve the problem of BG in feedstock of ethanol production has been to add a BG hydrolyzing enzyme, such as e.g., beta-glucanase, to the production system, so that beta-glucan is converted to glucose (see e.g., patent application publication, WO, 2008/1122282 and also co-pending U.S. patent application Ser. No. 12/424,145, filed Apr. 15, 2009).

However, the drawback of beta glucan hydrolysis is naturally that the valuable BG is not recovered for other uses. Thus, in exemplary embodiments, the methods disclosed herein separate protein, BG, or both from the small grains so the remaining grain biomass is useful as a feedstock for fuel ethanol production and at the same time generate value-added fraction enriched with protein or BG.

Accordingly, in an exemplary embodiment (see e.g., FIG. 6), the method comprises of alkaline extraction of ground grains, centrifugation of the alkaline slurry, acidification of the alkaline supernatant, recovery of protein fraction by centrifugation, precipitation of BG in the acidified supernatant by mixing with an alcohol, centrifugation to recover BG, and evaporation of the new supernatant to recover alcohol. The process steps are discussed above. Evaporation to recover alcohol is carried out by a vacuum evaporator at 85° C. The precipitate of the alkaline slurry following the first centrifugation is combined with the evaporated supernatant. The mixture is the rest of grain biomass to be used as a feedstock for fuel ethanol production. As an alternative method (FIG. 7), after the protein fraction is collected, the BG in the acidified supernatant is not recovered and this supernatant is combined with the precipitate of the alkaline slurry following the first centrifugation, and the mixture is the rest of grain biomass containing all components except for reduced amount of protein. It is to be used as a feedstock for fuel ethanol production.

Figure 8:
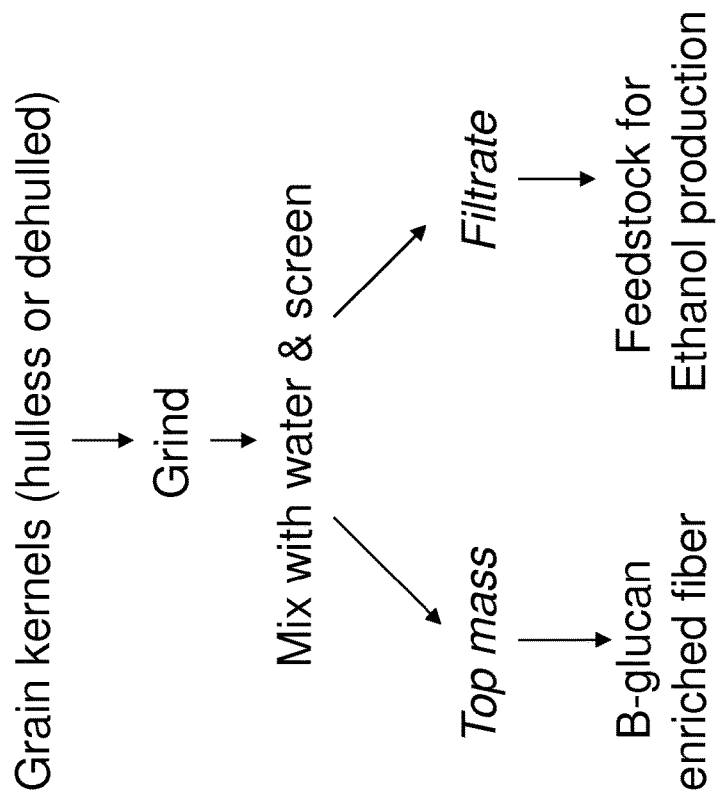
FIG. 8. A flow diagram showing another alternative method to pre-fractionate grains by removing beta-glucan enriched fiber before using as a feedstock for the ethanol production.
Figure 9:
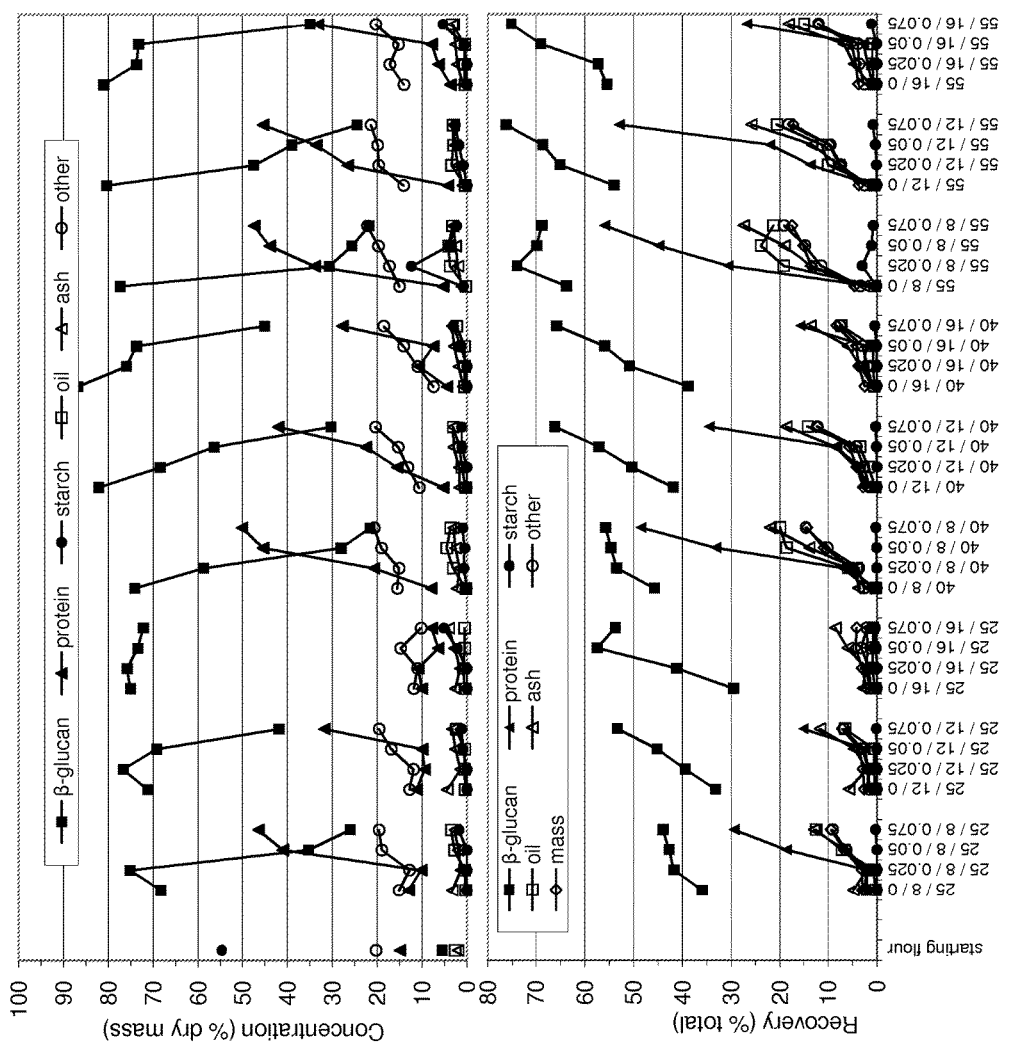
FIG. 9. Effects of alkaline concentration, solvent to flour ratio and extraction temperature on composition and recovery rates of mass and nutrients in the beta-glucan fraction obtained by the method of the invention.
Figure 10:
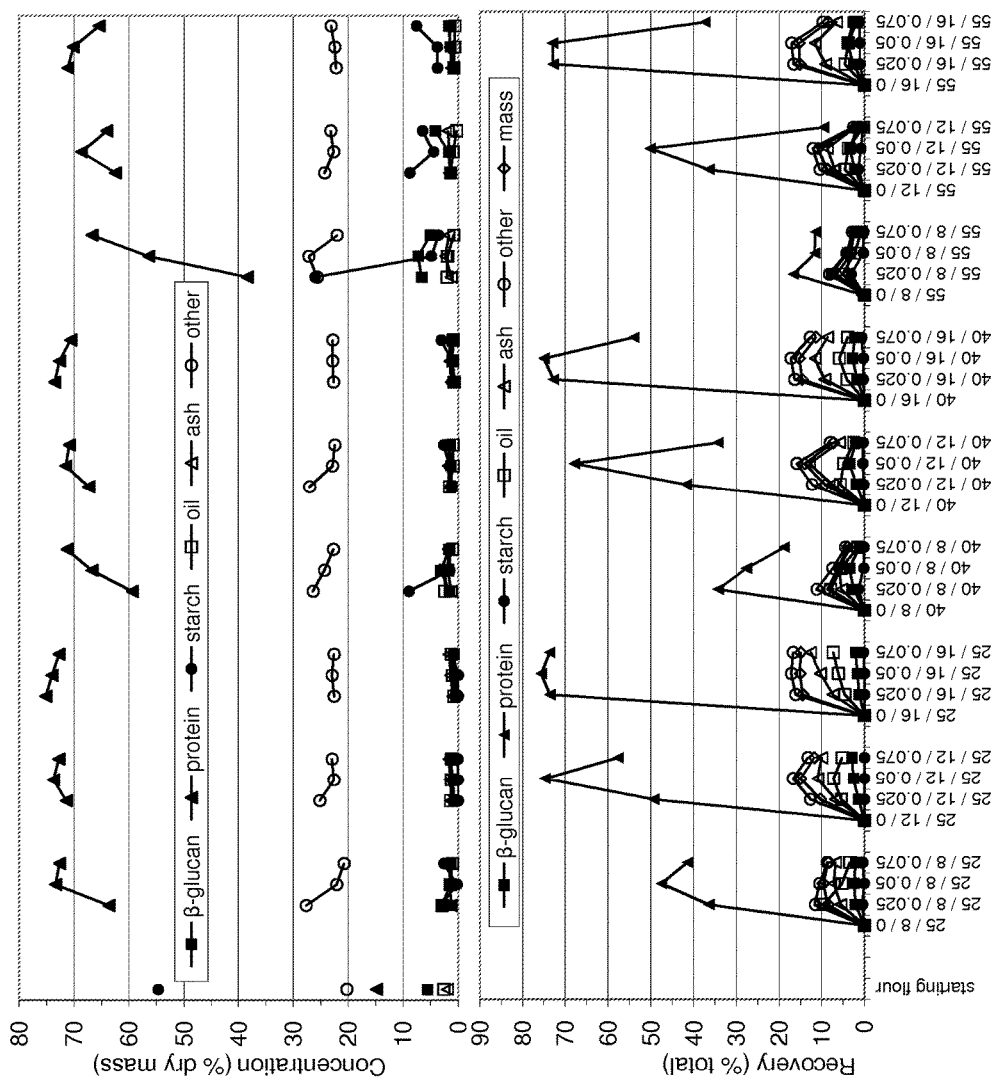
FIG. 10. Effects of alkaline concentration, solvent to flour ratio and extraction temperature on composition and recovery rates of mass and nutrients in the protein fraction obtained by the method of the invention.
Figure 11:
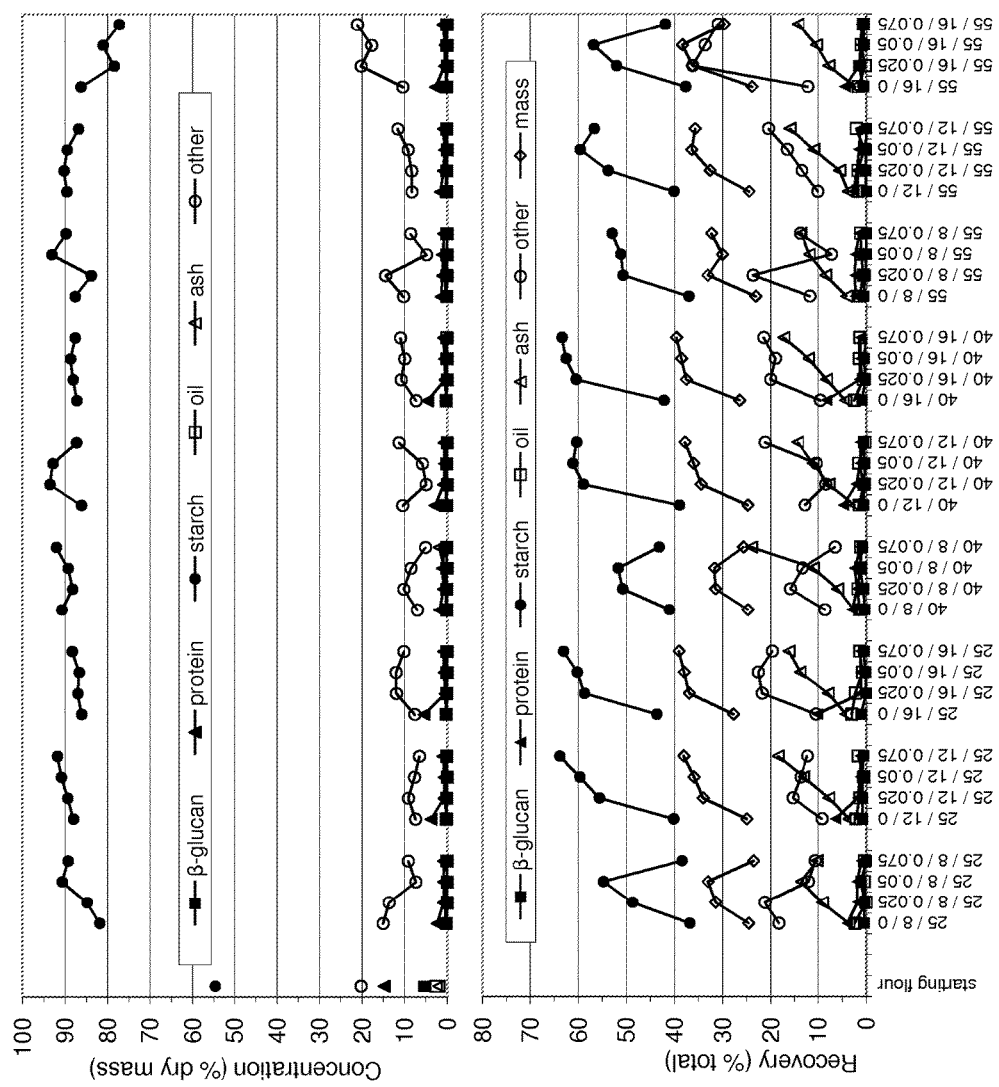
FIG. 11. Effects of alkaline concentration, solvent to flour ratio and extraction temperature on composition and recovery rates of mass and nutrients in the starch fraction obtained by the method of the invention.
Figure 12:
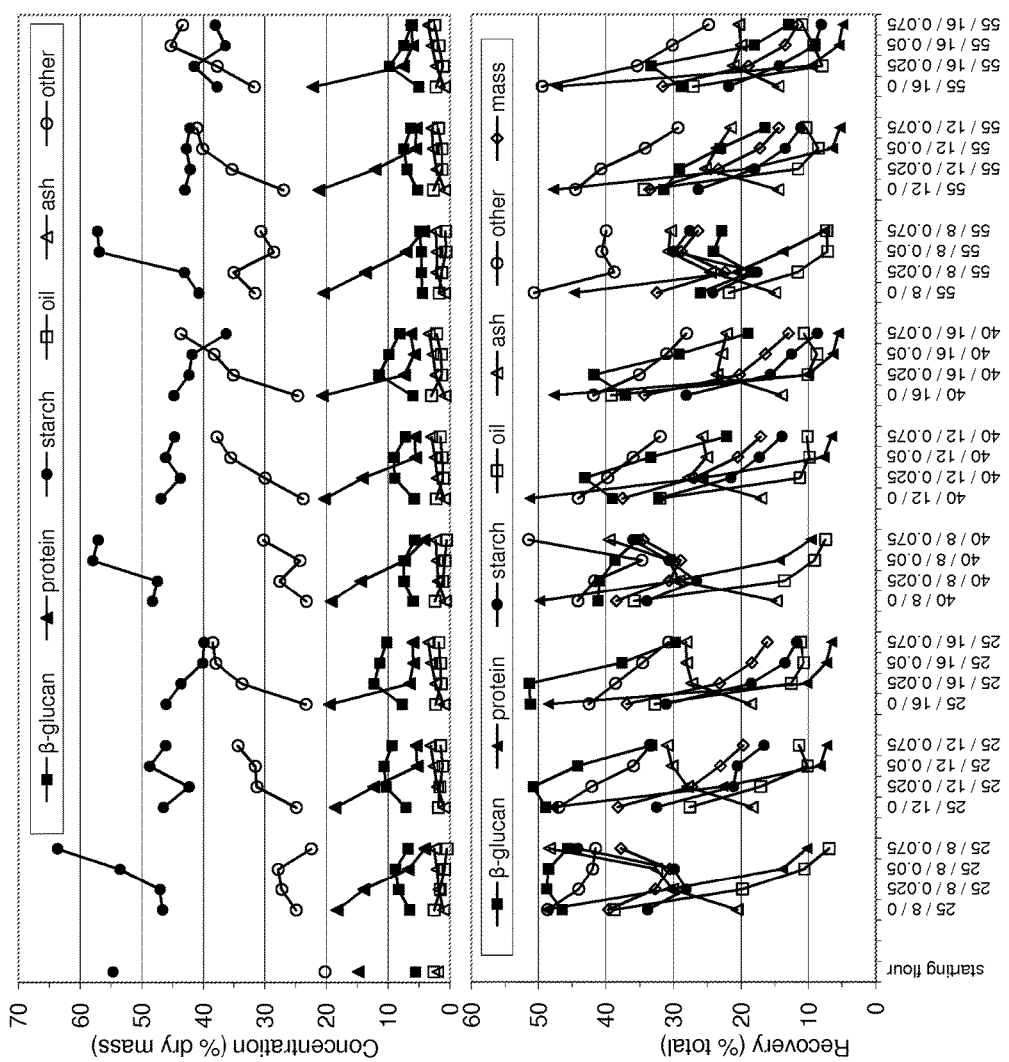
FIG. 12. Effects of alkaline concentration, solvent to flour ratio and extraction temperature on composition and recovery rates of mass and nutrients in the fiber fraction obtained by the method of the invention.

In another embodiment (see e.g., FIG. 8), water, instead of dilute alkaline, is used to slurry the ground grains. The solvent to flour ratio typically ranges from about 4:1 to about 20:1. The extraction temperature is room temperature or lower. The duration of extraction typically does not last more than 30 min. Without pausing after extraction, the slurry is screened and the top mass is collected and dried as a BG-enriched fiber fraction. The filtrate is the remaining grain biomass to be used as a feedstock for fuel ethanol production.

The following examples are offered to illustrate, but not to limit the invention.

EXAMPLES

Example 1

The following example illustrates the effects of alkaline concentration, solvent to flour ratio, and extraction temperature on barley fractionation.

Seeds of a hulless barley variety, Merlin, were ground into powder with a lab cyclone mill. The barley flour was processed according to FIG. 1. Briefly, 75 g (as is basis) flour was mixed with a NaOH solution in a proper amount by a mechanical mixer for 30 min. The slurry was centrifuged. The precipitate was mixed with water (in ⅓ volume of the alkaline used in the first step) and screened with a U.S. Standard mesh No. 270. The material on the top (top mass or overpass) was saved as a fiber fraction. The material that passed through (filtrate or underpass) was centrifuged. The precipitate was saved as a starch fraction. The supernatant of the underpass and the supernatant resulting from centrifugation of the alkaline slurry were combined, and the mixture was acidified with 2N HCl to pH 5.2. Upon another centrifugation, the precipitate was collected as a protein fraction. The supernatant was mixed with a proper amount of 95% ethanol so that the final ethanol concentration reached 30% (v/v). The mixture was centrifuged again and the precipitate was saved as a BG fraction.

The experiment was a factorial design with three factors: alkaline concentration, solvent to flour ratio, and extraction temperature. The NaOH concentration had four (4) levels: 0, 0.025, 0.050, and 0.075N. The combined (initial extraction and solvent during sieving) solvent to flour ratio had three levels: 8:1, 12:1, and 16:1. The extraction temperature had three levels: 25° C., 40° C., and 55° C. All centrifuge steps used the same centrifuge force (3500×g) and the same centrifuge time (25 min) except for the ethanol precipitation step, which used 2000×g and 10 min. All wet fractions were dried under a forced air oven at 60° C. overnight. Dried fractions plus the starting material were weighed and measured for contents of moisture, protein, oil, BG, ash and starch. Other was referred to as other carbohydrates, which was calculated based on 100%–the sum of all other constituents measured (% dry mass). The mass and nutrient recovery rates (yields) were calculated accordingly. The experiments were duplicated at the fractionation stage.

The concentrations and recovery rates of nutrients in the resulting BG fraction, protein fraction, starch fraction and fiber fraction were presented in FIGS. 9-12, respectively. Results show that all three factors had significant effects on both concentration and recovery in each fraction obtained. These effects varied with fractions and there were interactive effects among the three factors too. In general, for the BG fraction (FIG. 9), increasing alkaline concentration decreased BG concentration but increased its recovery, while increasing both protein content its recovery. Higher solvent to flour ratio boosted beta-glucan content and its recovery but reduced protein content and recovery. Higher temperature did not affect protein and BG contents, but increased protein and BG recovery.

For the protein fraction (FIG. 10), increasing alkaline concentration increased protein content slightly but caused great change in protein recovery with a peak at 0.05N concentration. Increasing solvent to flour ratio increased protein recovery. It also increased protein content when alkaline concentration was lower. Temperature had little effect. For the starch fraction (FIG. 11), all factors had little effects on the nutrient concentrations, but the alkaline concentration and solvent to flour ratio showed significant effects on nutrient recovery. For the fiber fraction (FIG. 12), both alkaline concentration and solvent to flour ratio affected composition and recovery significantly. Again, temperature had little effect.

Overall, the method was effective in enriching the four major nutrients (BG, protein, starch, and other fiber) from barley. Under optimal combinations of the three factors, the contents of BG, protein, starch and other fibers reached about 72%, 74%, 92% and 45% in their respective fractions. These fractions are thus suitable as value-added ingredients for food and feed. Also, under other optimal combinations, the recovery rates for BG, protein, starch and other fibers reached about 76%, 75%, 93%, and 51% in their respective fractions.

Example 2

The following Example illustrates the effect of oil removal on oat fractionation Seeds of hulless oat variety, Lamont, were ground into powder with a burr coffee grinder on a fine particle size setting (Braun type 3045). A portion of the oat flour was defatted with hexane. Both regular and defatted ground oats were subjected to processing according to FIG. 2. Briefly, 75 g (as is basis) oat flour was mixed with 900 ml 0.05N NaOH by a mechanical mixer for 30 min. The slurry was screened with a U.S. Standard mesh No. 100. The top mass was saved as a fiber fraction. The material that passed the screen was centrifuged. The precipitate was saved as a starch fraction. The supernatant was acidified with 2N HCl to pH 5.2. Upon another centrifugation, the precipitate was collected as a protein fraction. The supernatant was mixed with a proper amount of 95% ethanol so that the final ethanol concentration reached 50% (v/v). The mixture was centrifuged again and the precipitate was saved as a BG fraction.

The experiment was a blocked design to investigate the effect of oil removal. All the centrifuge steps used the same centrifuge force (3000×g) and same centrifuge time (20 min). All wet fractions were dried under a forced air oven at 60° C. overnight. Dried fractions plus the starting materials were weighed and measured for contents of moisture, protein, oil, BG, ash and starch. Other was referred to as other carbohydrates, which was calculated based on 100%−the sum of all other constituents measured (% dry mass). The mass and nutrient recovery rates (yields) were calculated accordingly. The experiments were duplicated at the sample preparation stage.

The starting material, ground oat groats, had a protein content of 18.41%, beta-glucan, 3.48%, starch 47.67%, and oil 6.10% (Table 1). When defatted by hexane, its oil content decreased to 1.76%, while contents of other nutrients increased slightly. Upon processing by the methods disclosed herein, four distinct fractions were obtained, including a protein fraction, a BG fraction, a starch fraction and a fiber fraction. Oil removal had significant effect ($P<0.05$) on composition of all the fractions. The most significant effect of oil removal was on the protein fraction. With regular oat flour, protein and oil contents were 64.16% and 23.88%, respectively, but with defatted material, the protein content increased to 85.70% while the oil content decreased to 3.32%. So, the majority of protein increase was due to reduced oil content in the protein fraction.

The largest mass recovery for regular oat groats was the starch fraction (about 47%), followed by the protein fraction, the fiber fraction, and the BG fraction (Table 1). Majority of protein (about 79%) in the original oats was recovered in the protein fraction. Interestingly, although oil removal increased protein content significantly in the protein fraction it did not increase protein recovery. The BG fraction recovered about 67% of total BG in the starting material, and 74.25-79.61% starch was recovered in the starch fraction. Oil removal had significant effects on recovery of oil in all four fractions. It also had an effect on starch recovery in the starch fraction. However, oil removal had no effect on both BG composition and its recovery.

TABLE 1

Effect of oil removal on composition and nutrient recovery in oat fractions

| Fraction | Moisture | Dry Mass | Protein (6.25 × N) | B-glucan | Starch | Oil | Ash | Others |
|---|---|---|---|---|---|---|---|---|
| Composition (% dry matter) | | | | | | | | |
| Original Oat Flour | 9.26 | 68.06 | 18.41 | 3.48 | 47.67 | 6.10 | 1.96 | 22.38 |
| Protein Fraction | 5.27 | 15.52 | 64.16 | 0.87 | 0.34 | 23.88 | 1.47 | 9.28 |
| Beta-glucan Fraction | 12.52 | 2.21 | 5.78 | 72.70 | 0.84 | 0.50 | 1.64 | 18.54 |
| Starch Fraction | 11.29 | 32.26 | 0.61 | 0.06 | 80.07 | 0.34 | 1.20 | 17.71 |
| Fiber Fraction | 10.44 | 11.09 | 6.18 | 4.43 | 43.42 | 3.58 | 5.28 | 37.11 |
| Defatted Oat Flour | 8.23 | 68.82 | 19.42 | 3.65 | 49.81 | 1.76 | 1.90 | 23.46 |
| Protein Fraction | 4.40 | 12.27 | 85.70 | 0.76 | 0.08 | 3.32 | 1.89 | 8.25 |
| Beta-glucan Fraction | 7.98 | 2.34 | 7.13 | 72.02 | 0.54 | 0.28 | 1.33 | 18.69 |
| Starch Fraction | 7.57 | 32.57 | 0.76 | 0.14 | 78.16 | 0.18 | 1.11 | 19.65 |
| Fiber Fraction | 6.95 | 14.39 | 5.63 | 3.56 | 47.41 | 3.02 | 4.42 | 35.96 |
| Recovery (% of total) | | | | | | | | |
| Regular oat flour | | | | | | | | |
| Protein Fraction | | 22.81 | 79.49 | 5.68 | 0.16 | 89.30 | 17.20 | 9.46 |
| Beta-glucan Fraction | | 3.25 | 1.02 | 67.89 | 0.06 | 0.26 | 2.73 | 2.69 |
| Starch Fraction | | 47.40 | 1.58 | 0.83 | 79.61 | 2.66 | 29.09 | 37.50 |
| Fiber Fraction | | 16.30 | 5.46 | 20.76 | 14.87 | 9.56 | 44.02 | 26.97 |
| Defatted oat flour | | | | | | | | |
| Protein Fraction | | 17.82 | 78.66 | 3.70 | 0.03 | 33.61 | 17.76 | 6.26 |
| Beta-glucan Fraction | | 3.40 | 1.25 | 66.96 | 0.04 | 0.55 | 2.39 | 2.70 |
| Starch Fraction | | 47.32 | 1.86 | 1.80 | 74.25 | 4.73 | 27.81 | 39.64 |
| Fiber Fraction | | 20.91 | 6.06 | 20.36 | 19.91 | 35.90 | 48.77 | 32.04 |

*Others refer to all other carbohydrates. The value was obtained by 100 − sum of all measured constituents, % dry mass.

Example 3

The following Example illustrates pre-fractionation of grains for protein and beta-glucan before using as a feedstock for ethanol production Seeds of a hulless barley variety, Merlin, were ground into powder with a lab cyclone mill. The barley flour was subjected to a method of this invention according to FIG. 6. Briefly, 37.5 g (as is basis) flour was mixed with 600 ml of 0.035N NaOH solution by a mechanical mixer for 30 min.

The alkaline slurry was centrifuged. The supernatant was acidified with 2N HCl to pH 5.2. Upon another centrifugation, the precipitate was collected as a protein fraction. The new supernatant was mixed with a proper amount of 95% ethanol so that the final ethanol concentration reached 30% (v/v). The mixture was centrifuged again and the precipitate was saved as a BG fraction. The supernatant was evaporated to recover ethanol. The evaporated supernatant and the precipitate resulting from the step of centrifuging the alkaline slurry were combined. The mixture or the precipitate alone can be used as a feedstock for a dry grind ethanol production process according to FIG. 5.

The composition and nutrient recovery rates of the BG fraction, the protein fraction, and the rest biomass as a feedstock of ethanol production are shown in Table 2, along with the composition of the starting material (ground barley groats). On dry matter basis, this starting material had a protein content of 14.87%, BG, 5.57%, starch, 54.71%, and oil, 2.62%. Following the process of this invention to remove protein and BG out of the ground barley (FIG. 6), the rest of biomass had much reduced protein and BG contents (3.85% and 2.57%, respectively), and at the same time, the starch content increased to 67.87%. This biomass had about 80% of the original mass, but contained only 20.75% of the total protein and 37.04% of total BG in the starting material. In other words, 79.25% protein and 62.96% BG were removed by the method of this invention. The resulting biomass became a much better feedstock of a dry grind process for a biofuel production. Of equal importance is that the pre-fractionation method produced two fractions, one enriched with 72.99% BG and the other with 75.10% protein. These products are much more valuable than distillers grains, the only co-product of the dry grind process.

Example 4

The following Example illustrates pre-fractionation of grains for protein before using as a feedstock for ethanol production Seeds of a hulless barley variety, Merlin, were ground into powder with a lab cyclone mill. The barley flour was subjected to a process according to FIG. 7. Briefly, 37.5 g (as is basis) flour was mixed with 600 ml of 0.035N NaOH solution by a mechanical mixer for 30 min at a room temperature. The alkaline slurry was centrifuged. The supernatant was acidified with 2N HCl to pH 5.2. Upon another centrifugation, the precipitate was collected as a protein fraction. The new supernatant and the precipitate resulting from the step of centrifuging the alkaline slurry were combined. The mixture was a feedstock for a dry-grind ethanol production process according to FIG. 5. The composition and nutrient recovery rates of the BG fraction, the protein fraction, and the rest biomass as a feedstock of ethanol production are shown in Table 2, along with the composition of the starting material (ground barley kernel).

The composition and nutrient recovery rates of the BG fraction and the rest biomass as a feedstock of ethanol production are also shown in Table 2, along with the composition of the starting material (ground barley kernel). On dry matter basis, this starting material had a protein content of 14.87%, BG, 5.57%, starch, 54.71%, and oil, 2.62%. Following the process of this invention (FIG. 7) to remove protein from the ground barley, the rest of biomass had much reduced protein content (3.95%) and at the same time, the starch content increased to 64.46%. This biomass had about 84.53% of the original mass, but contained only 22.48% of the total protein in the starting material, that is, 77.52% of the total protein was removed. The resulting biomass became a better feedstock of a dry grind process for fuel ethanol production. Of equal importance is that the pre-fractionation method produced a fraction enriched with 74.42% protein. The value of this fraction is much higher than distillers grains, the only co-product of the dry grind process.

TABLE 2

Composition and recovery of protein fraction, beta-glucan fraction and remaining biomass as compared to ground barley

Figure 6:
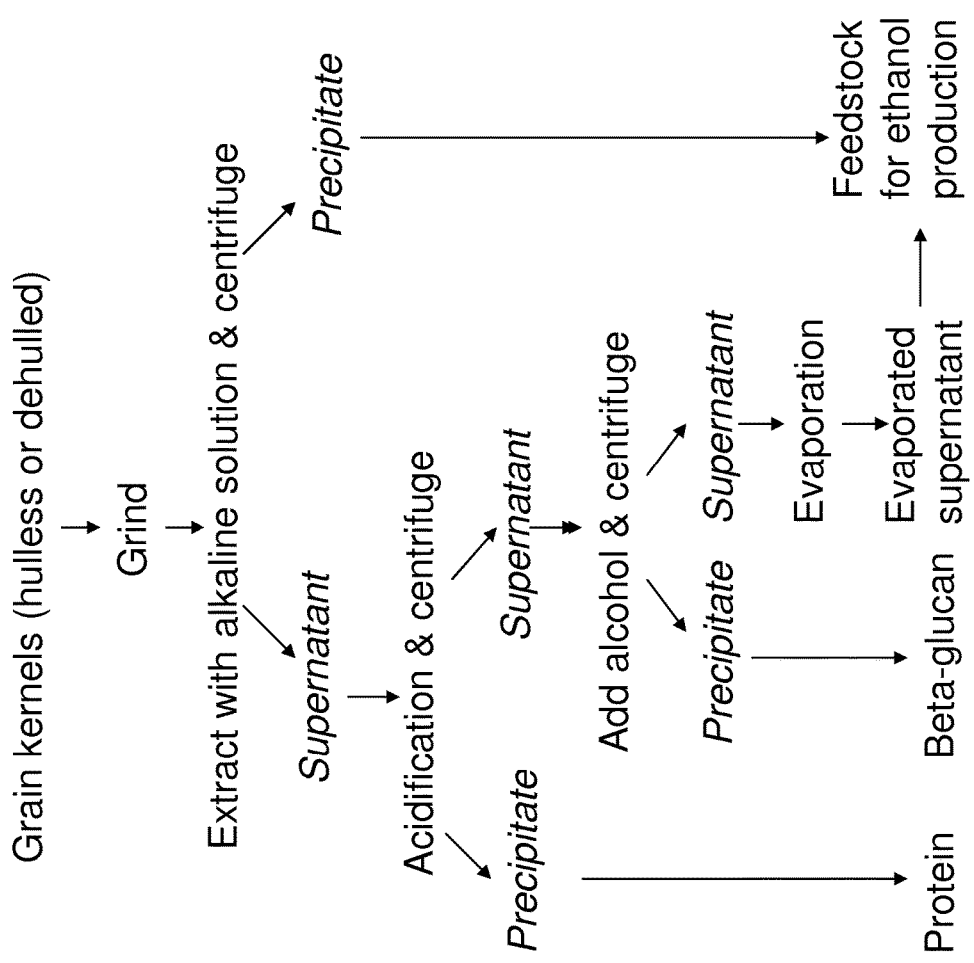
FIG. 6. A flow diagram showing the method to pre-fractionate grains by removing both protein and beta-glucan before using as a feedstock for the ethanol production, in accordance with the invention.
Figure 7:
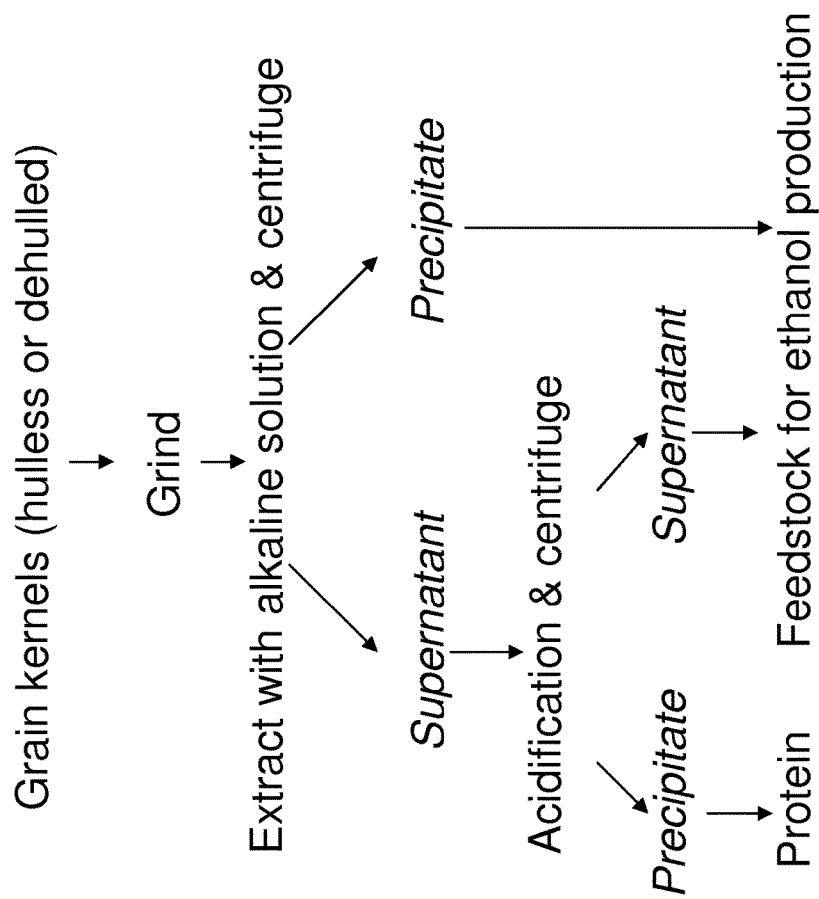
FIG. 7. A flow diagram showing an alternative method to pre-fractionate grains by removing protein before using as a feedstock for the ethanol production.

| Fraction | Dry mass | Protein (5.75 × N) | Beta-glucan | Starch | Oil | Ash | Others* |
|---|---|---|---|---|---|---|---|
| Composition (% dry matter) | | | | | | | |
| Ground barley | 34.71 | 14.87 | 5.57 | 54.71 | 2.62 | 1.97 | 20.26 |
| Fractions obtained by the Method of FIG. 6 (Example 3) | | | | | | | |
| Protein Fraction | 5.30 | 75.10 | 0.73 | 0.03 | 1.14 | 1.22 | 21.78 |
| Beta-glucan Fraction | 1.61 | 6.48 | 72.99 | 2.27 | 0.38 | 2.57 | 15.31 |
| Rest of the Biomass | 27.80 | 3.85 | 2.58 | 67.87 | 3.02 | 2.07 | 20.17 |
| Fractions obtained by the Method of FIG. 7 (Example 4) | | | | | | | |
| Protein Fraction | 5.37 | 74.42 | 0.65 | 0.19 | 1.23 | 1.36 | 22.15 |
| Rest of the Biomass | 29.34 | 3.95 | 6.45 | 64.46 | 2.86 | 2.08 | 20.20 |
| Recovery (% total recovery) | | | | | | | |
| Fractions obtained by the Method of FIG. 6 (Example 3) | | | | | | | |
| Protein Fraction | 15.27 | 77.13 | 2.00 | 0.01 | 6.65 | 9.44 | 16.41 |
| Beta-glucan Fraction | 4.64 | 2.02 | 60.79 | 0.19 | 0.67 | 6.04 | 3.51 |
| Rest of the Biomasss | 80.09 | 20.75 | 37.04 | 99.36 | 92.27 | 84.15 | 79.73 |

TABLE 2-continued

Composition and recovery of protein fraction, beta-glucan fraction and remaining biomass as compared to ground barley

| Fraction | Dry mass | Protein (5.75 × N) | Beta-glucan | Starch | Oil | Ash | Others* |
|---|---|---|---|---|---|---|---|
| Fractions obtained by the Method of FIG. 7 (Example 4) | | | | | | | |
| Protein Fraction | 15.47 | 77.44 | 1.81 | 0.05 | 7.27 | 10.66 | 16.91 |
| Rest of the Biomasss | 84.53 | 22.48 | 97.85 | 99.59 | 92.41 | 89.03 | 84.26 |

*Others refer to all other carbohydrates. The value was obtained by 100 − sum of all measured constituents, % dry mass.

Example 5

The following Example illustrates a first feeding fry study.

One hundred first feeding trout were placed in each of 15, 140 liter aluminum tanks. Each tank was equipped with an automatic feeder and was supplied with 12 liters per minute of 15° C. water, and provided with a 13/11 diurnal photoperiod. A fish meal based diet served as the control (~46% fishery processing meal) (Table 3), and the experimental diets contained only 5% fish meal with the rest of the protein replaced by the test ingredient. Both barley and oat protein concentrates were prepared according to FIG. 1 (Example 1) on a larger scale with many repetitions to produce sufficient materials for the feeding experiment. These samples are defined as "unheated". Another set of concentrates that are defined as "heated", and were also produced in the same way except that before drying under a forced air oven at 60° C. overnight they were autoclaved for 1 hr. Two diets containing either corn gluten meal or a bacterial protein were also fed for comparison. The barley protein concentrates contained approximately 66% crude protein and 9% lipid compared to 57% crude protein and 24% lipid in the oat protein concentrates. This difference in protein and lipid levels resulted in an inclusion rate of 48% of the diet for oats and 44% for the barley protein concentrates. Practical diets would not contain any one ingredient at the levels used in this study, but the study is designed to cause the greatest effect of an ingredient on fish performance possible. Both the use of young nutritionally naïve fish and high inclusion levels of the test ingredient contribute to the rapid response of fish to the diets.

TABLE 3

Composition of experimental diets for first feeding rainbow trout fed diets containing oat and barley protein concentrates.

| Grams/100 grams | Fish Control | Oat Unheated | Oat Heated | Barley Unheated | Barley Heated | Corn gluten | Bacterial protein |
|---|---|---|---|---|---|---|---|
| Fish meal[a] | 46.15 | 5.00 | 5.00 | 5.00 | 5.00 | 5.00 | 5.00 |
| Wheat gluten meal[b] | 9.00 | 9.00 | 9.00 | 9.00 | 9.00 | 9.00 | 9.00 |
| Corn Protein Conc.[c] | — | 4.00 | 4.00 | 4.00 | 4.00 | 4.00 | 4.00 |
| Oat Pro. Conc. Unheated[d] | — | 48.00 | — | — | — | — | — |
| Oat Pro. Conc. Heated[d] | — | — | 48.0 | — | — | — | — |
| Barley Pro. Conc. Unheated[d] | — | — | — | 44.00 | — | — | — |
| Barley Pro. Conc. Heated[d] | — | — | — | — | 44.00 | — | — |
| Corn gluten meal[e] | — | — | — | — | — | 40.00 | 18.12 |
| Bacterial protein[f] | — | — | — | — | — | — | 42.00 |
| Wheat flour[g] | 28.55 | 18.56 | 18.56 | 19.43 | 19.43 | 18.37 | 2.47 |
| Menhaden oil[h] | 10.80 | 5.00 | 5.00 | 10.30 | 10.30 | 14.70 | 12.50 |
| Lecithin | 3.00 | 3.00 | 3.00 | 3.00 | 3.00 | 3.00 | 3.00 |
| Lysine HCl | — | 0.80 | 0.80 | 2.15 | 2.15 | 2.80 | 1.55 |
| Methionine | — | 0.46 | 0.46 | 0.59 | 0.59 | 0.25 | 0.38 |
| Threonine | — | — | — | 0.35 | 0.35 | 0.40 | — |
| Dicalcium phosphate | 1.20 | 3.50 | 3.50 | 3.50 | 3.50 | 4.30 | 3.30 |
| Vitamin premix[i] | 1.00 | 1.00 | 1.00 | 1.00 | 1.00 | 1.00 | 1.00 |
| Vitamin C[j] | 0.20 | 0.20 | 0.20 | 0.20 | 0.20 | 0.20 | 0.20 |
| Trace min premix[k] | 0.10 | 0.10 | 0.10 | 0.10 | 0.10 | 0.10 | 0.10 |
| Taurine[l] | 0.50 | 0.50 | 0.50 | 0.50 | 0.50 | 0.50 | 0.50 |
| Potassium Chloride | 0.56 | 0.56 | 0.56 | 0.56 | 0.56 | 0.56 | 0.56 |
| Sodium Chloride | 0.28 | 0.28 | 0.28 | 0.28 | 0.28 | 0.28 | 0.28 |
| Magnesium oxide | 0.05 | 0.05 | 0.05 | 0.05 | 0.05 | 0.05 | 0.05 |

TABLE 3-continued

Composition of experimental diets for first feeding rainbow trout fed diets containing oat and barley protein concentrates.

| Grams/100 grams | Fish Control | Oat Unheated | Oat Heated | Barley Unheated | Barley Heated | Corn gluten | Bacterial protein |
|---|---|---|---|---|---|---|---|
| Calculated Composition, % as-fed | | | | | | | |
| Crude Protein, % | 44.9 | 44.8 | 44.8 | 45.0 | 45.1 | 44.9 | 45.7 |
| Lipid, % | 18.0 | 18.3 | 18.2 | 18.0 | 18.3 | 18.2 | 18.1 |

[a]BioOregon Proteins, SeaPro 75, 753 g/kg crude protein
[b]Manildra Milling, 778 g/kg crude protein
[c]Cargill, Empyreal 75, 756 g/kg crude protein
[d]Produced by described methods, Oat PC 571 g/kg crude protein, Barley PC 660 g/kg crude protein
[e]Ag-Depot, 642 g/kg crude protein
[f]Manildra Milling, 120 g/kg crude protein
[g]Fermented product experimentally produced, 460 g/kg crude protein
[h]Omega Proteins Inc., Virginia Prime menhaden oil
[i]ARS 702; contributed, per kg diet; vitamin A 9650 IU; vitamin D 6600 IU; vitamin E 132 IU; vitamin K3 1.1 gm: thiamin mononitrate 9.1 mg; riboflavin 9.6 mg; pyridoxine hydrochloride 13.7 mg; pantothenate DL-calcium 46.5 mg; cyancobalamin 0.03 mg; nicotinic acid 21.8 mg; biotin 0.34 mg; folic acid 2.5 mg; inositol 600 mg.
[j]Stay-C, 35%, DSM Nutritional Products
kContributed in mg/kg of diet; manganese 13; iodine 5; copper 9; zinc 40.
[l]NB Group Co. LTD., After both 3 and 6 weeks of feeding there was a significant effect of diet on weight gain. After 3 weeks of feeding the trout fed the fish meal based diet gained most weight (632% of initial weight) among the fish fed the other diets, as expected (Table 4). The trout fed the protein concentrates from both oats and barley gained significantly more weight than trout fed diets containing corn gluten meal or a bacterial protein. There was no effect of diet on survival at either 3 or 6 weeks with survival ranging from 93.0 to 98.0% (Table 4).

|  | n | Grams per fish | Survival | % Gain per fish [a] |
|---|---|---|---|---|
| Ingredient | | | | |
| Barley | 6 | 4.45 | 93.2 | 1484 |
| Oats | 6 | 4.47 | 96.5 | 1489 |

TABLE 4

The effect of diet on growth and survival of first feeding rainbow trout.

| | 3 weeks | | | 6 weeks | | |
|---|---|---|---|---|---|---|
| Diet | g/fish | Gain, % | Survival | g/fish | Gain, % | Survival |
| Fish meal control | $1.90^a$ | $632^a$ | 98.0 | $5.61^a$ | $1869^a$ | 95.0 |
| Oat Protein Conc. UH* | $1.45^b$ | $482^b$ | 96.0 | $4.18^{bc}$ | $1393^{bc}$ | 93.3 |
| Oat Protein Conc. H** | $1.73^a$ | $575^{ab}$ | 98.7 | $4.73^{bc}$ | $1576^{bc}$ | 93.0 |
| Barley Protein Conc. UH* | $1.40^b$ | $465^b$ | 99.3 | $4.10^c$ | $1368^c$ | 98.0 |
| Barley Protein Conc. H** | $1.65^{ab}$ | $550^a$ | 98.3 | $4.83^b$ | $1610^b$ | 95.0 |
| Corn gluten meal | $1.05^c$ | $350^c$ | 95.0 | $2.89^d$ | $963^d$ | 88.3 |
| Bacterial protein | $1.01^c$ | $335^c$ | 98.0 | $2.74^d$ | $915^d$ | 95.7 |
| Probability of a > F value | 0.001 | 0.001 | 0.57 | 0.001 | 0.001 | 0.15 |
| R-square value | 0.95 | 0.93 | 0.26 | 0.96 | 0.96 | 0.49 |
| Coefficient of variation, % | 6.35 | 3.78 | 3.02 | 6.11 | 6.10 | 4.02 |

*Unheated
**Heated

A factorial treatment analysis was conducted on the performance of trout fed the oat and barley concentrates. There was a significant effect of heat treatment but not grain type on weight gain (Table 5). The percent gain over initial weight of the trout fed the heat treated concentrates was 1592% compared to the unheated concentrates with 1380% gain. There was no effect of heat treatment on survival at after 6 weeks of feeding the experimental diets. There was no effect of the source of grain, barley or oats, on either weight gain or survival and no interaction of grain type and heat treatment (Table 5).

Table 5. Effect of type of grain concentrate and heat treatment on weight gain and survival of first feeding rainbow trout after 6 weeks of feeding; factorial analysis.

-continued

|  | n | Grams per fish | Survival | % Gain per fish [a] |
|---|---|---|---|---|
| Heat treatment | | | | |
| No | 6 | 4.14 | 95.7 | 1380 |
| Yes | 6 | 4.78 | 94.0 | 1592 |
| Diet | | | | |
| Oats, not heated | 3 | 4.18 | 93.3 | 1393 |
| Oats, heated | 3 | 4.73 | 93.0 | 1575 |
| Barley, not heated | 3 | 4.10 | 98.0 | 1368 |
| Barley, heated | 3 | 4.83 | 95.0 | 1610 |

-continued

|  | n | Grams per fish | Survival | % Gain per fish [a] |
|---|---|---|---|---|
| Probability of a > F value | | | | |
| Model |  | 0.002 | 0.50 | 0.002 |
| Grain |  | 0.90 | 0.21 | 0.90 |
| Heat treatment |  | 0.001 | 0.52 | 0.001 |
| Garin * Heat |  | 0.40 | 0.60 | 0.40 |
| R-square |  | 0.84 | 0.24 | 0.84 |
| Coefficient of variation |  | 3.90 | 4.5 | 3.90 |

[a] Percent gain = (final weight per fish/initial weight per fish) * 100

Ingredients that support growth and survival of trout that are equal to or better than 60% of the trout fed the fish meal control diet will be tested for digestibility.

Example 6

The following Example illustrates digestability determination of fish feeds. This is a prophetic Example.

The apparent digestibility of nutrients and energy and amino acid availability from the each of the ingredients will be determined in compounded, extruded diets. The methodologies employed will include standard procedures that are well established in the investigators' laboratories (e.g., Gaylord et al. 2004 Aquaculture Nutrition 10:345-352; Li et al. 2004 Aquaculture 236:485-496). Nutrient and energy availability will be determined. The methods of Cho et al. (1982) Comparative Biochemistry and Physiology 73B: 25-41 and Bureau et al. (1999) Aquaculture 180:345-358 will be used to estimate apparent digestibility coefficients (ADCs). Yttrium oxide will serve as the inert maker.

A complete reference diet (Table 6) meeting or exceeding all known nutritional requirements for rainbow trout will be blended with the test ingredients in a 70:30 ratio (dry-weight basis) to form test diets. The reference diet will be fish meal free in order to have low enough levels of phosphorus to detect availability of phosphorus in the test ingredients (formula attached).

TABLE 6

Composition of reference diet for digestibility trials with rainbow trout. Trial Formula

| Ingr Code | Ingredient Name | Formula Amount | Percent |
|---|---|---|---|
| 33 | Wheat flour | 29.33 | 29.330 |
| 44 | Squid meal | 25.00 | 25.000 |
| 69 | Soy Protein Concentrate | 17.14 | 17.140 |
| 41 | Fish oil, menhaden | 13.30 | 13.390 |
| 6 | Corn gluten meal, Cargill 2012 | 8.34 | 8.340 |
| 29 | Soybean meal, solvent extracted | 4.30 | 4.300 |
| 76 | Vitamin Premix ARS 702 | 1.00 | 1.000 |
| 79 | Choline CL | 0.60 | 0.600 |
| 81 | Taurine | 0.50 | 0.500 |
| 78 | Stay-C | 0.20 | 0.200 |
| 77 | Trace min pre. ARS 640 | 0.10 | 0.100 |
| 89 | Yitrium oxide | 0.10 | 0.100 |

This diet has been used successfully in several digestibility and growth trials with rainbow trout (Barrows et al., 2008 Aquaculture, 283, 148-155; Gaylord et al., 2009 Aquaculture Nutrition. 15:306-312; Barrows et al., 2009 Aquaculture. 283:143-147). Apparent digestibility coefficients of each nutrient in the test diet and ingredients will be calculated according to the following equations (Kleiber 1961: *The fire of life: an introduction to animal energetics.* John Wiley and Sons, Inc., New York, N.Y., USA, Forster 1999 Aquaculture Nutrition 5:143-145):

$$ADCN_{diet} = 100 - 100\{\% \text{ Yt in diet} \times \% \text{ nutrient in feces}\}/\{\% \text{ Yt in feces} \times \% \text{ nutrient in diet}\}$$

$$ADCN_{Ingredient} = \{(a+b)ADCN_t - (a)ADCN_r\}b^{-1}$$

where, $ADCN_{ingredient}$=apparent digestibility coefficient of the nutrient in the test ingredient $ADCN_t$=apparent digestibility coefficients of the nutrient in the test diets $ADCN_r$=apparent digestibility coefficients of the nutrient in the reference diet a=(1−p)×nutrient content of the reference diet b=p×nutrient content of the test ingredient p=proportion of test ingredient in the test diet All diets will be manufactured by cooking extrusion (DNDL-44, Buhler AG, Uzwil, Switzerland) with an 18-s exposure to an average of 127° C. in the sixth extruder barrel section. The die plate will be water cooled to an average temperature of 60° C. Pellets of 3-mm will be produced then dried in a pulse-bed drier (Buhler AG, Uzwil, Switzerland) for 25 minutes at 102° C. with a 10-minute cooling period. Final moisture levels will be less than 10%. The final step will be top-coating the dried and cooled feed with fish oil using a vacuum coater (A.J. Mixing, Ontario, Canada).

Rainbow trout will be fed the experimental diets at the USDA/ARS Laboratory in Bozeman, Mont. Ten fish weighing approximately 700-g each will be stocked into 500-L tanks. Water temperature will be maintained at 15° C. and lighting will be maintained on a 14:10 h diurnal cycle. Each diet will be fed to three different tanks of fish to satiation by hand for two weeks prior to sampling. Fecal samples will be obtained by manual stripping, 16-18 h post-feeding, during week 3. Manual stripping of all fish in each tank will be accomplished by netting and anesthetizing the fish, followed by gently drying and then applying pressure to the lower abdominal region to express fecal matter into a plastic weighing pan. Care will be taken to exclude urinary excretions from the collection. Fecal samples for a given tank will be dried overnight at 50° C. and stored at −20° C. until chemical analyses are performed.

Example 7

The following Example illustrates a growth trial with juvenile rainbow trout. This is another prophetic Example.

Once digestibility of nutrients has been determined, the test ingredient will be evaluated in a growth trial with juvenile rainbow trout following standard procedures (Barrows et al 2008 supra, Barrows et al 2009, supra). All diets will be manufactured as described for the digestibility trials. Diets will be formulated to meet or exceed all know requirements for rainbow trout (NRC, 2011 SAS Procedures Guide, 9.2 edn. SAS Institute, Cary, N.C. National Research Council (NRC) 1993. Nutrient Requirements of Fish and Shrimp. Washington D.C.: National Academies Press. 376 pp) and contain graded levels of the test ingredient with the maximum level being determined by the specific nutrient composition of the ingredients. Experimental diets with juvenile fish will be fed for 9 weeks, with the average starting weight of the trout between 10 and 20 grams/fish and will be fed by hand to satiation. Gain, feed intake, feed conversion ratio, protein and energy retention and survival will be determined. Data will be analyzed using the general linear models procedure of SAS (SAS Institute, Cary, N.C.).

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for processing small grains to provide four separate nutrient fractions wherein the fractions are: a protein enriched fraction, a starch enriched fraction, a beta-glucan enriched fraction and a fiber enriched fraction, the method comprising:
    (a) grinding the small grain to provide a flour,
    (b) mixing the flour with an alkaline solution to a pH range of 8.00-12.00 to provide an alkalized mixture, wherein said alkaline solution consists of (a) water and (b) NaOH, or KOH, or NaOH and KOH;
    (c) centrifuging the alkalized mixture to provide a supernatant as a saved liquid fraction and a precipitate comprising fiber and starch;
    (d) mixing the precipitate with water or a solvent to form a resuspended precipitate;
    (e) pouring the resuspended precipitate over a screen to produce a solid fraction on top of the screen, and a liquid underpass under the screen;
    (f) centrifuging the liquid underpass to provide a starch fraction and a supernatant;
    (g) combining the supernatants from step (f) and the saved liquid fraction from step (c) to provide a combined supernatant;
    (h) adding an acid to the combined supernatant to bring pH of the combined supernatant to between about pH 3.75 to about pH 6.50 thereby providing an acidified combined supernatant;
    (i) centrifuging the acidified combined supernatant to provide a beta-glucan supernatant and a precipitate comprising protein;
    (j) collecting the precipitate comprising protein to provide a protein fraction;
    (k) adding an alcohol to the beta-glucan supernatant to precipitate beta-glucan;
    (l) centrifuging the precipitated beta-glucan to recover the beta-glucan as a beta-glucan fraction;
    thereby processing small grains to provide four separate nutrient fractions wherein the fractions are: a protein enriched fraction, a starch enriched fraction, a beta-glucan enriched fraction and a fiber enriched fraction.

2. The method of claim 1, wherein prior to step b, the flour is defatted.

3. The method of claim 2, wherein the flour is defatted with hexane or other organic solvent.

4. The method of claim 1, wherein the small grain is a member selected from the group consisting of barley and oats.

5. A method for processing small grains to provide four separate nutrient fractions wherein the fractions are: a protein enriched fraction, a starch enriched fraction, a beta-glucan enriched fraction and a fiber enriched fraction, the method comprising:
    (a) grinding the small grain to provide a flour,
    (b) mixing the flour with an alkaline solution to a pH range of 8.00-12 to provide an alkalized mixture;
    (c) pouring the alkalized mixture over a screen to produce a solid fraction on top of the screen and a liquid underpass below the screen;
    (d) collecting the solid fraction on top of the screen to produce a fiber fraction;
    (e) collecting the liquid underpass
    (f) centrifuging the liquid underpass to provide a precipitate as a starch fraction and a supernatant;
    (g) collecting the starch fraction;
    (h) adding an acid to the supernatant to bring the pH of the supernatant to a pH that is between about 3.75 to about 6.50, thereby providing an acidified supernatant;
    (i) centrifuging the acidified supernatant to provide a beta-glucan supernatant and a precipitate comprising protein;
    (j) collecting the precipitate comprising protein as a protein fraction;
    (k) adding alcohol to the beta-glucan supernatant to precipitate beta-glucan;
    (l) centrifuging the precipitated beta-glucan to recover the beta-glucan as a beta-glucan fraction;
    thereby processing small grains to provide four separate nutrient fractions wherein the fractions are: a protein enriched fraction, a starch enriched fraction, a beta-glucan enriched fraction and a fiber enriched fraction.

6. A method for processing small grains to provide three separate nutrient fractions wherein the fractions are: a protein enriched fraction, a starch enriched fraction, and a beta-glucan enriched fiber fraction, the method comprising:
    (a) grinding the small grain to provide a flour,
    (b) mixing the flour with water to provide an aqueous mixture;
    (c) pouring the aqueous mixture over a screen to produce a solid fraction on top of the screen and a liquid underpass below the screen;
    (d) collecting the solid fraction on top of the screen to produce a beta-glucan enriched fiber fraction;
    (e) collecting the liquid underpass;
    (f) mixing the liquid underpass with an alkaline solution to a pH range of 8.00-12 to provide an alkalized mixture;
    (g) centrifuging the liquid underpass to provide a precipitate as a starch fraction and a supernatant;
    (h) collecting the starch fraction;
    (i) adding an acid to the supernatant to bring the pH of the supernatant to a pH that is between about 3.75 to about 6.50, thereby providing an acidified supernatant;
    (j) centrifuging the acidified supernatant to provide an acidified supernatant and a precipitate comprising protein;
    (k) collecting the precipitate comprising protein as a protein fraction;
    thereby processing small grains to provide three separate nutrient fractions wherein the fractions are: a protein enriched fraction, a starch enriched fraction, and a beta-glucan enriched fiber fraction.

7. A method for processing small grains to provide a protein enriched fraction, a beta-glucan enriched fraction, a starch enriched fraction, and a fiber enriched fraction, the method comprising:
    (a) grind grains into flour,
    (b) mix the flour with water and centrifuge;
    (c) add an alcohol to the supernatant, centrifuge, and collect the precipitate as a BG fraction;
    (d) mix the precipitate of step (c) with an alkaline solution at a pH range of 8.00-11.50 and centrifuge;
    (e) mix the precipitate with water, screen the slurry, and collect the material on the top of the screen as a fiber fraction;
    (f) centrifuge the filtrate and collect the precipitate as a starch fraction;

(g) combine the supernatants from steps (d) and (f), add an acid to the mixture to bring pH of the mixture to 3.75-6.50, centrifuge, and collect the precipitate as a protein fraction.

8. A method for processing small grains to provide a protein enriched fraction, a beta-glucan enriched fraction and feedstock for ethanol production, the method comprising:
    (a) grinding the small grain to provide a flour,
    (b) mixing the flour with an alkaline solution having a pH of between about 8 to about pH 12 to provide an alkalized mixture;
    (c) centrifuging the alkalized mixture to provide a supernatant and a precipitate;
    (d) adding acid to the supernatant to bring the pH to between about 3.75 to about 6.5 to provide an acidified supernatant;
    (e) centrifuging the acidified supernatant to provide a precipitate comprising protein and a beta-glucan supernatant;
    (f) adding alcohol to the beta-glucan supernatant to provide an alcoholized supernatant, wherein beta-glucan has at least begun to precipitate;
    (g) centrifuging the alcoholized supernatant to remove the beta-glucan precipitate;
    (h) evaporating the alcoholized supernatant to recover the alcohol;
    (i) mixing the evaporated supernatant with the precipitate from step (c) to provide a feedstock for dry grind ethanol process.

9. A method for processing small grains to provide a protein enriched fraction and feedstock for ethanol production, the method comprising:
    (a) grinding the small grain to provide a flour,
    (b) mixing the flour with an alkaline solution having a pH of between about 8 to about pH 12 to provide an alkalized mixture;
    (c) centrifuging the alkalized mixture to provide a first supernatant and a first precipitate;
    (d) adding acid to the first supernatant to bring the pH to between about 3.75 to about 6.5 thereby providing an acidified supernatant;
    (e) centrifuging the acidified supernatant to provide a second precipitate comprising protein and a second supernatant comprising beta-glucan;
    (f) collect the second precipitate as a protein fraction;
    (g) Mixing the second supernatant with the first precipitate from step (c) to provide a feedstock for dry grind ethanol process.

10. A method for processing small grains to provide a beta-glucan enriched fiber fraction and a feedstock for ethanol production, the method compromising of
    (a) grinding the small grain to provide a flour,
    (b) mixing the flour with water to provide an aqueous mixture;
    (c) pouring the aqueous mixture over a screen to produce a solid fraction on top of the screen as the beta-glucan enriched fiber fraction and a liquid underpass below the screen as the feedstock for dry grind ethanol production.

* * * * *